United States Patent
Chen et al.

(12) 
(10) Patent No.: US 11,297,594 B2
(45) Date of Patent: Apr. 5, 2022

(54) AUTOMATED CELL LOCATION ESTIMATION AND VALIDATION

(71) Applicant: AT&T Intellectual Property I, L.P., Atlanta, GA (US)

(72) Inventors: Jie Chen, Watchung, NJ (US); Ye Ge, Holmdel, NJ (US); Abraham George, Litchfield, CT (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/887,431

(22) Filed: May 29, 2020

(65) Prior Publication Data

US 2021/0377905 A1 Dec. 2, 2021

(51) Int. Cl.
  *H04W 64/00* (2009.01)
  *H04W 56/00* (2009.01)

(52) U.S. Cl.
  CPC ..... *H04W 64/006* (2013.01); *H04W 56/0045* (2013.01); *H04W 64/003* (2013.01)

(58) Field of Classification Search
  None
  See application file for complete search history.

(56) References Cited

U.S. PATENT DOCUMENTS

| | | | | |
|---|---|---|---|---|
| 9,078,229 | B1 * | 7/2015 | Vannucci | G01S 5/0242 |
| 9,144,055 | B2 * | 9/2015 | Sun | H04W 64/003 |
| 10,904,851 | B1 * | 1/2021 | Henry | G01S 5/0242 |
| 2003/0125046 | A1 * | 7/2003 | Riley | G01S 5/0242 |
| | | | | 455/456.1 |
| 2010/0323723 | A1 * | 12/2010 | Gerstenberger | G01S 5/0242 |
| | | | | 455/456.5 |
| 2010/0331013 | A1 * | 12/2010 | Zhang | G01S 5/0242 |
| | | | | 455/456.2 |
| 2014/0243013 | A1 * | 8/2014 | Liu | H04W 64/003 |
| | | | | 455/456.1 |
| 2016/0170004 | A1 * | 6/2016 | Kim | G01S 5/0036 |
| | | | | 342/451 |
| 2019/0250241 | A1 * | 8/2019 | Alawieh | G01S 11/14 |

* cited by examiner

*Primary Examiner* — German Viana Di Prisco
(74) *Attorney, Agent, or Firm* — Amin, Turocy & Watson, LLP

(57) ABSTRACT

Locations of cells of a communication network can be estimated, determined, and validated. Cell location component (CLC) can analyze timing advance (TA) measurement data and/or location data associated with devices associated with a base station associated with one or more cells. CLC can estimate a first location of the base station, based on the TA measurement data and/or location data, to facilitate estimating the location of an associated cell. CLC can validate the estimated cell location or recorded cell location of the cell (recorded in a cell location pool) based on analysis of estimated cell location, recorded cell location, TA measurement data, and/or location data, and, based on the validation, can tag the cell location determination as accurate, acceptable, bad, or uncertain. CLC can request additional monitoring of a cell location determination tagged as uncertain, or investigation of a cell location determination tagged as bad.

20 Claims, 14 Drawing Sheets

US 11,297,594 B2

AUTOMATED CELL LOCATION ESTIMATION AND VALIDATION

TECHNICAL FIELD

This disclosure relates generally to electronic communications, e.g., to automated cell location estimation and validation.

BACKGROUND

A node, such as a base station, of a communication network can be associated with one or more cells. For instance, a node can be associated with a single cell or multiple cells can be co-located with a same node at a given location. Base stations and cells associated with base stations are added to communication networks, removed from communication networks, or moved to different locations within communication networks on a regular basis. It is expected that thousands of new cells will be added to the communication networks each year.

The above-described description is merely intended to provide a contextual overview regarding electronic communications, and is not intended to be exhaustive.

DETAILED DESCRIPTION

Figure 1:
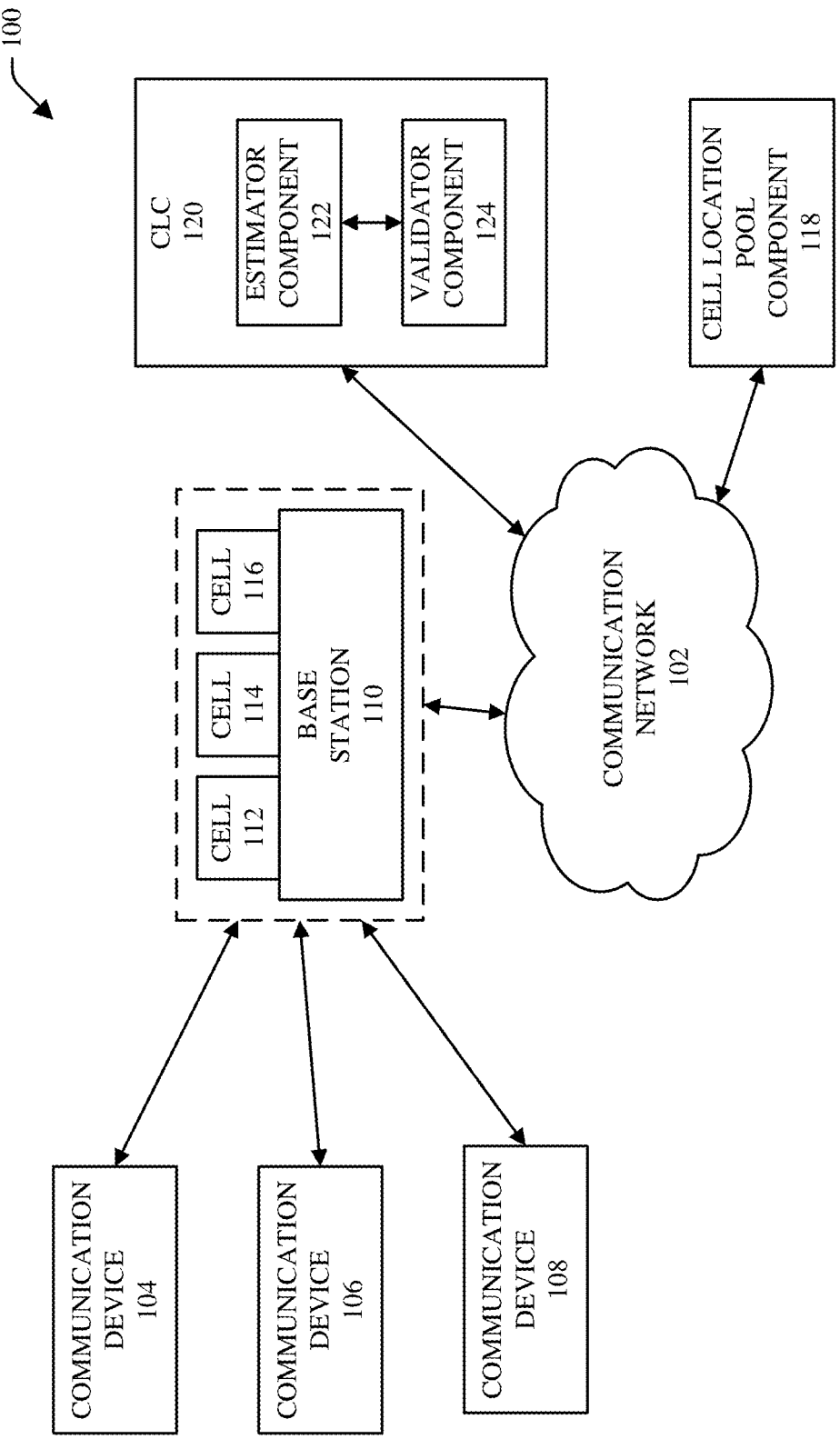
FIG. 1 illustrates a block diagram of an example system that can estimate a location of a node to facilitate estimating, determining, and/or validating a location of a cell associated with the node, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to estimating locations of cells and validating cell locations (e.g., estimated cell locations and/or recorded cell locations from data sources) of cells of a communication network. The disclosed subject matter can enhance (e.g., improve or optimize) the accuracy of cell location information for service providers, which can enhance design and efficiency of the communication network, enhance performance of the communication network, enhance the user experience with regard to communications via the communication network, reduced waste in capital investment (e.g., financial costs) and resource usage, enhance E911 operations (e.g., enhance the accuracy of determining locations of mobile communication devices in response to mobility E911 calls).

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/ HSPA, Global System for Mobile Communications (GSM)/ GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can multiple with a factor of $N_t$ over single antenna systems in a rich scattering environment.

Nodes, such as base stations, can be associated with one or more cells that can be distributed at various locations in a communication network. A node can be associated with a single cell, or multiple cells can be co-located with a same node at a given location. Base stations and cells associated with base stations are added to or removed from communication networks, or are moved to different locations within communication networks, on a regular basis. It is expected that thousands of new cell sites will be added to the communication networks each year.

It can be desirable to know accurate locations of cells for a variety of reasons. The locations of cells can be used to facilitate determining locations of communication devices (e.g., cell or smart phones) associated with cells, for example, when it is desired to know the locations of such communication devices for emergency purposes, such as during E911 dispatch operations, or for other desired reasons. As another example, it can be desirable to accurately know locations of cells for radio access network (RAN) planning, network optimization, and/or ongoing operations of communication networks.

However, cell location information often can be inaccurate due to erroneous information or incomplete information inputted to a cell location database when people manually input information into the cell location database, inaccurate or incomplete information received from certain cells that can self report their locations, or other sources of error in cell locations. Inaccurate cell locations can result in undesirable problems with regard to, for example, E911 dispatch operations and RAN planning.

For instance, with regard to E911 calls, while mobile communication devices often can provide location information (e.g., GPS location information) regarding their locations, sometimes such location information of mobile communication devices may not be available. At least in such instances, the communication network, via the cells of the network, can be utilized to facilitate determining locations of mobile communication devices. During an E911 dispatch operation, a mobility E911 call from a mobile communication device can route to a serving public safety answering point (PSAP) based on the location of the cell site that handles the E911 call. For example, for Phase 2 capable PSAPs, the evolved serving mobile location center (E-SMLC) can return a calculated location for the E911 caller. Inaccuracies in either the PSAP call routing (e.g., due to error or other inaccuracy in the location of the cell that handles the E911 call) or reported caller location can cause an undesirable delay in providing desired emergency assistance from emergency assistance personnel (e.g., law enforcement, medical personnel (e.g., emergency medical services (EMS)), or other emergency personnel).

As another example, with regard to RAN planning, locations of existing cell sites, along with demand forecast and radio frequency (RF) propagation, can be key inputs for the RAN capacity planning process. Errors or other inaccuracies in cell site locations can lead to erroneous and inefficient RAN planning and design of the communication network, which can result in wasted capital investment in the communication network and/or undesirable (e.g., inefficient, suboptimal, and/or poor) communication network performance.

As new communication network technology (e.g., 5G NR millimeter waves (5G NR mmWave) or other new communication network technology) is deployed in the communication network, thousands of new cells at new cell locations (e.g., cell sites) are expected to be added to the communication network each year, for the foreseeable future. The validation of the accuracy of locations of cells can be a significant problem for which it can be desirable for a network operator or provider to address to facilitate improving E911 dispatch operations, RAN planning, and communication network performance.

Traditional techniques for determining and validating cell locations can be undesirably inefficient, inaccurate or insufficiently accurate, or otherwise undesirable. For instance, manual investigation can be one traditional method to determine, correct errors in, or verify cell locations. Manual investigation can involve dispatching a person (e.g., an engineer or technician) to visit a site of a cell to determine or verify the location of the cell site. This can be inefficient and/or can lead to inaccuracies with regard to cell locations because it can be undesirably labor intensive to have such person determine and verify the cell location, since the person will have to take the time to travel to each of many cell locations to determine and verify the respective locations of those cell location, it can be undesirably inaccurate because such person can inadvertently input erroneous or incomplete information to the cell location database, and/or it can be difficult to scale as there can be a very large number of cells that are to have their locations determined and verified.

Another traditional technique for determining and validating cell locations can be image-based validation Image-based validation can involve checking cell site locations via satellite or street view images (e.g., geographical map images) of objects, such as base stations associated with cells. The image-based validation can be conducted by humans, which can be undesirably labor intensive and/or can result in inaccurate results, or can utilize artificial intelligence (AI) based image recognition. Overall, the image-based validation method can be highly depending on the image quality and reliability of the images used to determine and validate the locations of the cells. For example, satellite or street view images usually can be refreshed once every several months or years. However, new cell sites added to the communication network often may not be captured in the satellite or street view images. Further, the image-based validation method often can only provide insufficient or incomplete information regarding the cells. For instance, from a satellite or street view image, the image-based validation method typically only can tell if there is a cell at a location in the image, but cannot confirm other cell attributes, such as, for example, RF band and an equipment vendor, of the cell. In addition, AI-based image recognition can utilize a significant and undesirable amount of resources to procure the images and train or implement the AI image recognition models.

Still another traditional technique for determining and validating cell locations can involve utilizing inference based on drive tests. There have been attempts to utilize drive test data to approximately estimate cell locations. However, given the undesirably limited measurement and relatively large time intervals (e.g., several months or quarters) between subsequent drive tests, this drive-test inference technique can be undesirable (e.g., inadequate, inefficient, or inaccurate), as this technique may not be able to capture, or at least adequately capture, deployed cell sites, including newly deployed cell sites. For example, the estimation errors for cell locations can be on the order of 300 meters, which can be undesirable (e.g., unsatisfactory or unsuitable) for the purpose of cell location accuracy and validation.

To that end, techniques for estimating, determining, and validating locations of cells of a communication network are presented. A cell location component (CLC) can analyze timing advance (TA) measurement data and/or location data (e.g., global positioning system (GPS) location data, assisted or augmented GPS (AGPS) location data, and/or Internet of things (IoT) geolocation data) associated with communication devices that can be associated with a base station, which can comprise or be associated with one or more cells (e.g., respective communication devices can be associated with (e.g., served by, communicatively connected to, observed by, or otherwise associated with respective cells). The CLC can include an estimator component that can estimate a location of the base station (e.g., a network node associated with the one or more cells), based at least in part on the respective TA measurement data and/or the respective location data associated with the respective communication devices, in accordance with defined cell location management criteria. In some embodiments, the estimator component can utilize machine learning (ML) techniques and algorithms to facilitate estimating the location of the base station.

In some embodiments, the estimator component can determine whether there is a sufficient number (e.g., a defined threshold number) of communications at or within a defined threshold distance of the base station, based at least in part on the respective TA measurement data associated with the respective communication devices. If the estimator component determines that there is a sufficient number of communications at or within the defined threshold distance of the base station, the estimator component can determine that a smallTA algorithm can be utilized to estimate the location of the base station, in accordance with the defined cell location management criteria. In such instance, employing the smallTA algorithm, the estimator component can estimate the location of the base station based at least in part on (e.g., as a function of) the location data (e.g., AGPS or GPS location data) of those communication devices that are determined to be at or within the defined threshold distance of the base station. For instance, the estimator component can estimate the location of the base station based at least in part on the median of the communication device locations as determined from the location data of those communication devices.

In certain embodiments, if, instead, the estimator component determines that there is not a sufficient number of communications at or within the defined threshold distance of the base station, the estimator component can determine that a linear regression algorithm can be utilized to estimate the location of the base station. The estimator component can apply the linear regression algorithm, with respect to respective pairs of locations of communication devices, and can estimate the location of the base station based at least in part on the respective TA measurement data and/or the respective location data associated with the respective communication devices, and the application of the linear regression algorithm, in accordance with the defined cell location management criteria. The CLC can estimate the location of a cell associated with the base station based at least in part on the estimated location of the base station (e.g., as determined using the smallTA algorithm or the linear regression algorithm). For instance, the CLC can estimate the location of the cell as being the estimated location of the associated base station.

The CLC also can include a validator component that, for each cell, can validate a potential location of a cell (e.g., the estimated cell location, or a recorded cell location of the cell, as obtained from a data source and recorded in a cell location pool) based at least in part on an analysis of the estimated cell location, the recorded cell location, and/or the TA measurement data and/or location data associated with the communication devices (e.g., communication devices associated with the cell), in accordance with the defined cell location management criteria. In accordance with various embodiments, the validator component can utilize a validation algorithm (e.g., distance difference validation algorithm) and/or a set of validation rules to facilitate validating the potential cell location, including determining an accuracy level that can indicate how accurate the potential cell location is. Based at least in part on the results of the validation, the CLC can tag the potential cell location as being accurate, acceptable, bad, or uncertain, for example.

If the CLC determines that a potential cell location (e.g., estimated cell location, or recorded cell location) of a cell is accurate, the CLC can lock the cell location with a "good" or "accurate" tag to facilitate preventing undesired (e.g., unwanted, inadvertent, or unexpected) changes to the cell location, and can store the cell location information for the cell (e.g., updated cell location information), including the lock and tag information, in the cell location pool. If the CLC determines that a potential cell location is bad (e.g., unacceptably inaccurate), the CLC can tag the potential cell location as being bad, can store the cell location information for the cell (e.g., updated cell location information), including the bad tag, in the cell location pool, and can initiate a cell location investigation to facilitate having a manual investigation (e.g., manual investigation on map, or a physical visit to the cell) performed to determine the cell location. If the CLC determines that a potential cell location is uncertain, the CLC can tag the potential cell location with an uncertain tag and can initiate a cell monitoring request to request that further data collection (e.g., TA measurement data, AGPS or GPS location data, . . . ) be performed for a desired period of time (e.g., a longer period of time) for further evaluation by the CLC to facilitate desirably (e.g., accurately) determining the location of the cell.

These and other aspects and embodiments of the disclosed subject matter will now be described with respect to the drawings.

Referring now to the drawings, FIG. 1 illustrates a block diagram of an example system 100 that can estimate a location of a node (e.g., base station) to facilitate estimating, determining, and/or validating a location of a cell associated with the node, in accordance with various aspects and embodiments of the disclosed subject matter. The system 100 can include a communication network 102 that can comprise a mobility core network (e.g., a wireless communication network) and/or a packet data network (e.g., an Internet Protocol (IP)-based network, such as the Internet and/or intranet) that can be associated with the mobility core network.

The mobility core network of the communication network 102 can operate to enable wireless communication between communication devices and/or between a communication device and the communication network 102. The communication network 102 can include various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, . . . ) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can include multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can include, or can be associated with (e.g., communicatively connected to) a network device of the communication network 102.

At given times, one or more communication devices, such as, for example, communication device 104, communication device 106, and communication device 108, can connect or attempt to connect to the communication network 102 to communicate with other communication devices associated with the communication network 102. A communication device (e.g., 104, 106, or 108, . . . ) also can be referred to as, for example, a device, a mobile device, or a mobile communication device. The term communication device can be interchangeable with (or include) a UE or other terminology. A communication device (or UE, device, . . . ) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, . . . ), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, . . . , having wireless communication functionality), a set-top box, an IP television (IPTV), a device associated or integrated with a vehicle (e.g., automobile, airplane, bus, train, or ship, . . . ), a virtual assistant (VA) device, a drone, a home or building automation device (e.g., security device, climate control device, lighting control device, . . . ), an industrial or manufacturing related device, a farming or livestock ranch related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can include various network components or devices, which can include one or more base stations, such as, for example, base station 110. For instance, the mobility core network can include one or more radio access networks (RANs) (not explicitly shown in FIG. 1), wherein each RAN can include one or more base stations (e.g., access points (APs)), such as, for example base station 110. Each base station (e.g., base station 110) can serve communication devices (e.g., communication devices 104, 106, and/or 108) located in respective coverage areas served by respective base stations in the mobility core network of the communication network 102. The respective base stations can be associated with one or more sectors (not shown), wherein respective sectors can comprise respective cells. For instance, the base station 110 can comprise or be associated with one or more cells, such as, for example, cell 112, cell 114, and/or cell 116. The cells can have respective coverage areas that can form the coverage area covered by the one or more sectors. The respective communication devices can be communicatively connected to the communication network 102 via respective wireless or wireline communication connections with one or more of the respective cells.

In some embodiments, a RAN can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN. In certain embodiments, the RAN can be a cloud-RAN (C-RAN) that can be located in or associated with a cloud computing environment, which can include various cloud network components of the communication network 102.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

As disclosed herein, it can be desirable to accurately know the locations of cells (e.g., cell 112, cell 114, cell 116) associated with the communication network 102. There are various data sources that can contain and provide, with varying degrees of reliability, location information of the locations of cells at different levels of granularity, such as, for example, transmitter location, node location (e.g., eNodeB location), or UE-specific identifier (USID) location, etc. Some example data sources can include ATOLL and CSSNG. Such location information regarding cell locations usually can be collected by different vendors or carriers. The system 100 can include a cell location pool component 118 that can receive, obtain, or collect the location information regarding the locations of the cells from the various data sources, for example, in a centralized place form or place (e.g., a data store or database of the cell location pool component 118). The cell location pool component 118 can be associated with (e.g., communicatively connected to) the communication network 102 (as depicted) or part of the communication network 102.

The cell location pool component 118 can share (e.g., provide or make available) the location information regarding the cell locations with downstream applications for cell location validation or other desired uses. Different data sources typically can use different cell keys (e.g., cell tower ID (CellID), cell global identification (CGI), E-UTRAN CGI (ECGI), cell name (cellname), global cell identity (GCI), or other type of cell key). The cell location pool component 118 can unify the cell key for a cell, which can be used (e.g., can relatively easily be used) to join with network measurement reported cell key.

In accordance with various embodiments, to facilitate improving the accuracy of cell locations of cells, the system 100 can include a cell location component (CLC) 120 that can employ an estimator component 122 that can desirably estimate or determine respective locations of respective cells (e.g., cell 112, cell 114, cell 116) associated with respective base stations (e.g., base station 110) of the communication network 102, based at least in part on respective timing advance (TA) measurement data and/or respective location data (e.g., AGPS location data, GPS location data, and/or IoT geolocation data) associated with respective communication devices (e.g., communication devices 104, 106, and/or 108) associated with the respective base stations. In some embodiments, the estimator component 122 can employ machine learning techniques and algorithms to facilitate estimating or determining respective locations of respective nodes (e.g., base station 110) to facilitate estimating or determining respective locations of cells associated with the respective nodes, in accordance with defined cell location management criteria.

The CLC 120 also can include a validator component 124 that can validate or verify the accuracy of cell locations. For instance, for each cell (e.g., cell 112, cell 114, and cell 116), the validator component 124 can validate or verify the accuracy of the estimated location of the cell or a recorded location of the cell, wherein the validator component 124 can obtain information relating to (e.g., indicating or identifying) the recorded location of the cell from the cell location pool component 118. In some embodiments, for each cell (e.g., cell 112, cell 114, and cell 116), the validator component 124 can perform a cross validation of the estimated location of the cell and (e.g., vis-à-vis, or in relation to) one or more recorded locations of the cell obtained from one or more data sources (e.g., and stored in the cell location pool component 118), as more fully described herein. The validator component 124 can employ validation techniques and algorithms, and/or can employ machine learning techniques and algorithms, to facilitate validating or verifying the accuracy of the estimated location of the cell or recorded location of the cell.

Based at least in part on the level of accuracy of the estimated location or recorded location of the cell (e.g., cell 112, cell 114, or cell 116), the validator component 124 can tag the estimated location or recorded location of the cell as being accurate, acceptable, bad (e.g., unacceptable), or uncertain, or with other desired accuracy level identifiers. The CLC 120 can provide feedback information (e.g., validation results from the validator component 124) to the cell location pool component 118, as or when desired (e.g., on a regular or periodic basis, dynamically, based on random cell location checks, or as otherwise desired), to facilitate updating the cell location pool component 118 with improved (e.g., more accurate or corrected) cell location results and/or with the most reliable data source for respective cells (e.g., cell 112, cell 114, or cell 116). For instance, if the CLC 120 determines improved (e.g., more accurate or corrected) cell location information for a cell (e.g., cell 112, cell 114, or cell 116), and/or determines a particular cell location associated with (e.g., provided by) a particular data source has a higher accuracy level than other cell location information associated with other data sources, the CLC 120 can update the cell location information for the cell in the cell location pool component 118 with the improved cell location results and/or with the most reliable data source. The cell location pool component 118 can share the improved cell location information, obtained from the improved cell location results and/or with the most reliable data source, with other downstream applications.

In some embodiments, if the CLC 120 determines that a potential cell location (e.g., estimated cell location, or recorded cell location) of a cell (e.g., cell 112, cell 114, or cell 116) is accurate, the CLC 120 can lock the cell location with a "good" or "accurate" tag to facilitate preventing undesired (e.g., unwanted, inadvertent, or unexpected) changes to the cell location information of the cell that is stored in the cell location pool of the cell location pool component 118, and can store the cell location information (e.g., updated cell location information) for the cell, including the lock and tag information, in the cell location pool of the cell location pool component 118. If the CLC 120 determines that a potential cell location is bad (e.g., unacceptably inaccurate), the CLC 120 can tag the potential cell location as being bad, can store the cell location information (e.g., updated cell location information) for the cell, including the bad tag, in the cell location pool of the cell location pool component 118, and can initiate a cell location investigation to facilitate having a manual investigation (e.g., manual investigation on map, or a physical visit to the cell) performed to determine the cell location, as more fully described herein.

In certain embodiments, if the CLC 120 determines that a potential cell location (e.g., estimated cell location, or recorded cell location) of a cell (e.g., cell 112, cell 114, or cell 116) is uncertain, the CLC 120 can tag the potential cell location with an uncertain tag and can initiate a cell monitoring request to request that further data collection (e.g., TA measurement data, AGPS or GPS location data, and/or IoT geolocation data, . . . ) be performed for a desired period of time (e.g., a longer period of time). The CLC 120 can evaluate the additional collected data with respect to the potential cell location, estimate the cell location based at least in part on the additional collected data, and perform cell validation on the estimated cell location and/or a recorded cell location(s) for the cell, to facilitate desirably (e.g., accurately) determining the location of the cell, in accordance with the defined cell location management criteria, as more fully described herein.

Other aspects and embodiments of the disclosed subject matter will be described with regard to the other figures (and/or FIG. 1).

Figure 2:
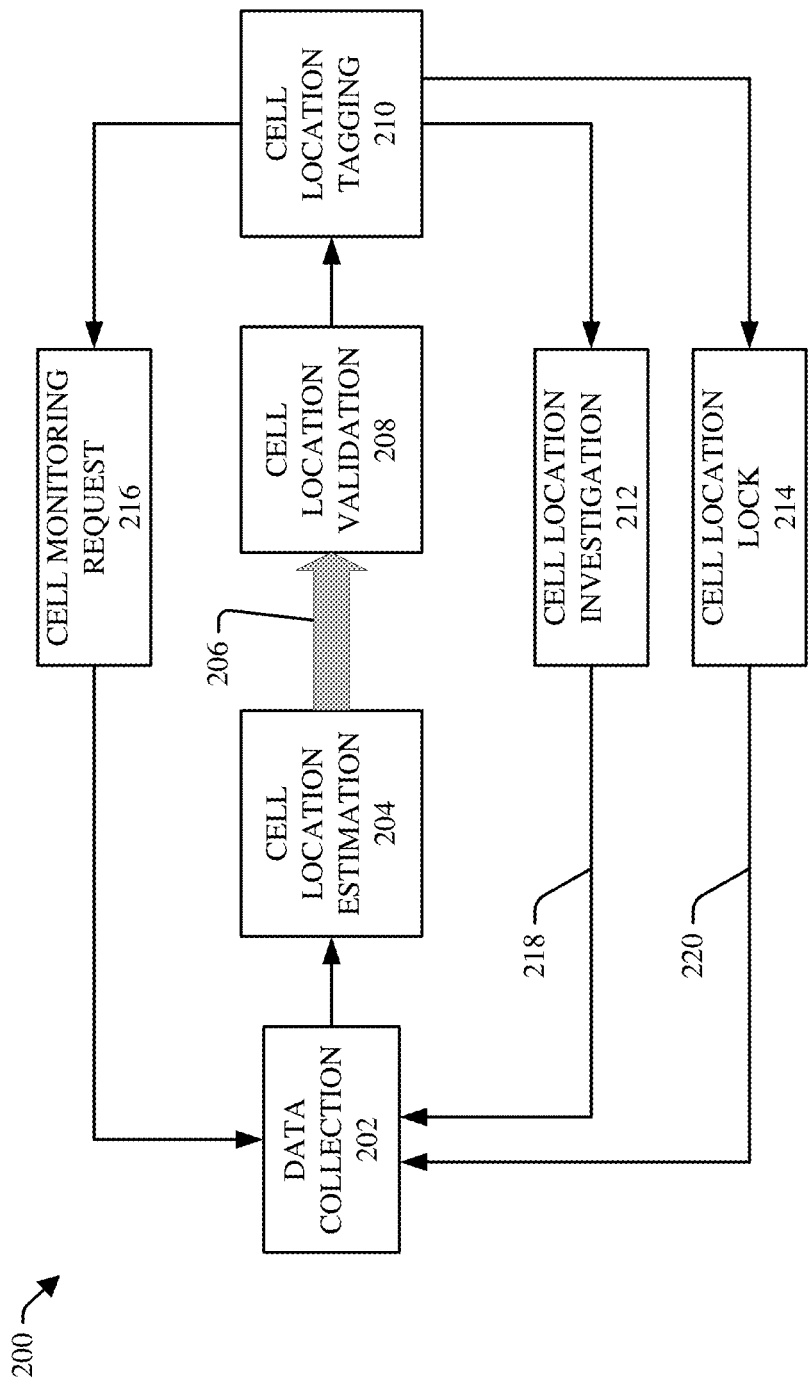
FIG. 2 depicts a block diagram of an example cell location estimation and validation process, in accordance with various aspects and embodiments of the disclosed subject matter.

Referring to FIG. 2 (along with FIG. 1), FIG. 2 depicts a block diagram of an example cell location estimation and validation process 200, in accordance with various aspects and embodiments of the disclosed subject matter. As indicated at reference numeral 202 of the cell location estimation and validation process 200, the CLC 120 can perform data collection to collect desired (e.g., relevant) data, including, for example, respective location data relating to respective communication devices (e.g., communication devices 104, 106, and/or 108) associated with respective base stations (e.g., base station 110) of the communication network 102, and respective call trace records associated with the respective communication devices. Location data associated with a communication device can include, for example, location data (e.g., AGPS or GPS location data, or location data from drive tests, . . . ) reported actively by the communication device, or, for a stationary communication device (e.g., a fixed or stationary IoT device), location data (e.g., IoT geolocation data, AGPS or GPS location data, Wi-Fi location positioning data, or long range wide area networks (LoRa WAN), . . . ). Call trace records can include trace measurement data or TA measurement data and/or real time difference (RTD) data from which the distance between a communication device (e.g., communication device 104) and cell locations of cells (e.g., cell 112, cell 114, or cell 116) can be derived or determined. With some communication devices, there can be both location data and TA measurement data, whereas, with other communication devices there may be either location data or TA measurement data.

The CLC 120 can combine or join the respective location data associated with respective communication devices with respective TA measurement data and/or RTD data based at least in part on respective device identifiers (e.g., UE IDs) of the respective communication devices and respective timestamps associated with the respective location data and/or respective TA measurement or RTD data. The CLC 120 also can group the respective location data, respective TA measurement data, and/or respective RTD data associated with respective communication devices (e.g., communication devices 104, 106, and/or 108) by serving node (e.g., each base station, such as base station 110). As disclosed, each serving node (e.g., base station 110) can be associated with or can comprise a single cell (e.g., cell 112) or a cluster of cells (e.g., cell 112, cell 114, and/or cell 116, . . . ) that can be on the same base station and can share the same location (e.g., cells of the cluster can be co-located).

In accordance with various embodiments, the estimator component 122 can employ a machine learning (ML) engine that can utilize an ML algorithm to estimate the respective locations of the respective cells (e.g., cell 112, cell 114, and/or cell 116, . . . ) of each node, based at least in part on the results of analyzing the respective location-related data (e.g., respective location data, respective TA measurement data, and/or respective RTD data) associated with the respective communication devices (e.g., communication devices 104, 106, and/or 108, . . . ), as indicated at reference numeral 204 of the cell location estimation and validation process 200. The ML engine can determine and generate (e.g., as an output) estimated locations of cells (e.g., cell 112, cell 114, and/or cell 116, . . . ), as presented at reference numeral 206 of the cell location estimation and validation process 200. The estimator component 122 can apply the ML algorithm to the respective location data, respective TA measurement data, and/or respective RTD data associated with the respective communication devices (e.g., communication devices 104, 106, and/or 108, . . . ) served by or associated with the same node (e.g., served by or associated with the cluster of cells associated with the same node). The disclosed subject matter, by having the CLC 120 (e.g., estimator component 122 of CLC 120) aggregate such location-related data by node (e.g., base station 110), can enable the CLC 120 to desirably (e.g., accurately, suitably, or optimally) estimate and validate the location(s) of a cell(s) (e.g., a cell(s) associated with the node) that may have relatively few observed communication devices connected to or associated with the cell(s) based at least in part on such cell(s) being co-located with another cell(s) associated with the same node.

As part of the ML engine flow employed by the estimator component 122, after grouping the data (e.g., respective location-related data) by serving node (e.g., base station 110), the estimator component 122, employing the ML engine, can determine whether there are a sufficient number (e.g., at least a defined threshold number) of communication devices (e.g., communication devices 104, 106, and/or 108, . . . ) observed close to the node. If the estimator component 122 determines that there are a sufficient number of communication devices observed close to (e.g., within a defined distance of) the node, the estimator component 122 can determine that a smallTA algorithm can be utilized to estimate the location of the node. If the estimator component 122 determines that there is not a sufficient number of communication devices observed close to the node, the estimator component 122 can instead determine that a linear regression algorithm can be utilized to estimate the location of the node.

Figure 3:
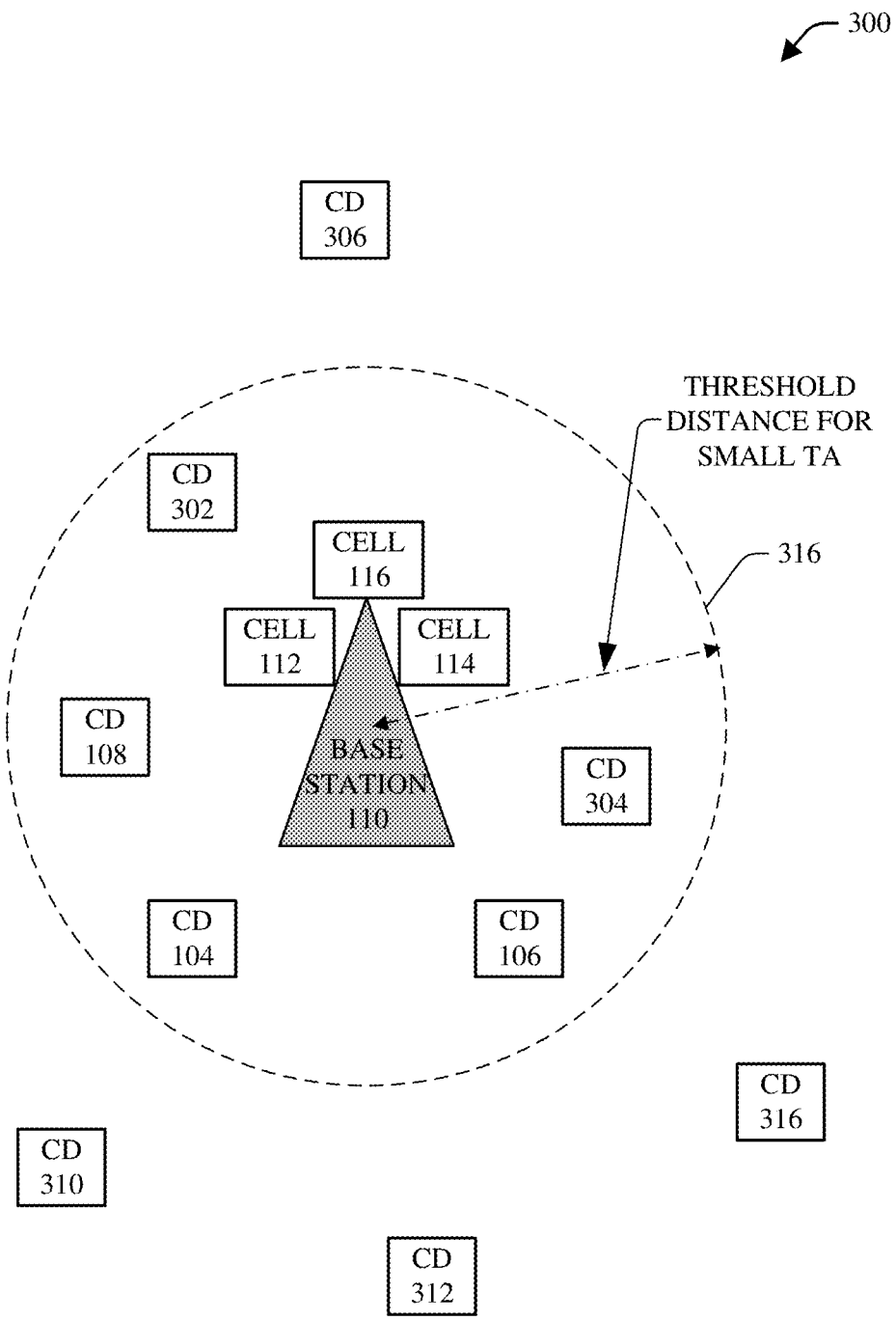
FIG. 3 depicts a diagram of an example communication device distribution in relation to a node associated with one or more cells, in accordance with various aspects and embodiments of the disclosed subject matter.

Referring to FIG. 3 (along with FIGS. 1 and 2), FIG. 3 depicts a diagram of an example communication device distribution 300 in relation to a node (e.g., base station) associated with one or more cells, in accordance with various aspects and embodiments of the disclosed subject matter. As presented in the communication device distribution 300, a plurality of communication devices (CDs), such as communication devices 104, 106, 108, 302, 304, 306, 308, 310, 312, and 314, can be associated with (e.g., served or observed by) a node (e.g., base station 110), wherein the respective communication devices can be distributed in various locations in relation to the node. The base station 110 can be associated with or comprise one or more cells, such as cells 112, 114, and/or 116, that can be associated with respective communication devices of the plurality of communication devices.

Some of the communication devices, such as communication devices 104, 106, 108, 302, and 304, can be located at or within a defined threshold distance (e.g., distance perimeter 316) of the base station 110, whereas other communication devices, such as communication devices 306, 308, 310, 312, and 314, can be located further away from the base station 110 outside of the defined threshold distance of the base station 110. The CLC 120 can determine and/or set the defined threshold distance based at least in part on (e.g., in accordance with; as indicated or specified by) the defined cell location management criteria, wherein the defined threshold distance can relate to whether or not the smallTA algorithm is to be utilized by the estimator component 122 to estimate the location of the node (and associated cells). In some embodiments, the defined threshold distance can be 100 meters, and in other embodiments, the defined threshold distance can be less than or greater than 100 meters, depending on the applicable cell location management criteria.

The CLC 120 can determine (e.g., calculate or derive) the respective locations of the respective communication devices (e.g., 104, 106, 108, 302, 304, 306, 308, 310, 312, and/or 314) in relation to the node (e.g., base station 110) based at least in part on the respective TA measurement data associated with the respective communication devices. The estimator component 122 can analyze the communication device distribution 300 to determine whether sufficient sample data points (e.g., communication device data points) exist with measured TAs indicating the associated communication devices are sufficiently close (e.g., at or within the defined threshold distance of) the location of the node. A smaller TA measurement can indicate that a communication device is relatively close to the node, whereas a larger TA measurement can indicate that a communication device is relatively farther away from the node. If the estimator component 122 determines that there is a sufficient number (e.g., at least a defined threshold number) of communication devices are at or within the defined threshold distance of the node (e.g., base station 110), the estimator component 122 can determine that the smallTA algorithm can be utilized to estimate the location of the node. The CLC 120 can determine or set the defined threshold number based at least in part on (e.g., in accordance with; as indicated or specified by) the defined cell location management criteria.

As an example, if the defined threshold number is 5 (or less than 5) for using the smallTA algorithm, the estimator component 122 can determine that there are 5 communication devices (e.g., communication devices 104, 106, 108, 302, and 304) located at or within the defined threshold distance of the node and 5 other communication devices (e.g., 306, 308, 310, 312, and 314) located outside the defined threshold distance of the node (e.g., base station 110), and accordingly, can determine that the smallTA algorithm can be utilized to estimate the location of the node. If, instead the defined threshold number is 8 for using the smallTA algorithm, the estimator component 122 can determine that there are 5 communication devices (e.g., communication devices 104, 106, 108, 302, and 304) located at or within the defined threshold distance of the node, and accordingly, can determine that, since 5 is less than the defined threshold number of 8, the smallTA algorithm is not to be utilized to estimate the location of the node, but rather, the linear regression algorithm is to be utilized to estimate the location of the node.

It is to be appreciated and understood that, for reasons of brevity, clarity, and illustration, the example communication device distribution 300 depicts a total of 10 communication devices, and accordingly, for reasons of brevity, clarity, and illustration, relatively small defined threshold numbers are utilized with regard to this example for determining whether or not to utilize the smallTA algorithm to estimate the node location. In accordance with various embodiments, for determining whether or not to utilize the smallTA algorithm to estimate a node location, the defined threshold number of communication devices at or within the defined threshold distance of the node can be larger than 5 communication devices or 8 communication devices, as such defined threshold number is indicated or specified by the defined cell location management criteria. For example, the defined threshold number can be 10, 15, 20, 25, . . . , 50, . . . 100, or virtually any desired number less than or greater than 100.

If the estimator component 122 determines that there is a sufficient number (e.g., at least a defined threshold number of) communication devices located at or within the defined threshold distance of the node (e.g., base station 110), the estimator component 122 can determine that the smallTA algorithm can be utilized to estimate the location of the node. In some embodiments, the estimator component 122, employing the smallTA algorithm, can determine the respective locations of the subgroup of communication devices at or within the defined threshold distance, based at least in part on the respective location data (e.g., AGPS or GPS location data) of those respective communication devices, and can estimate the location of the node (e.g., base station 110) based at least in part on (e.g., as a function of) a median (e.g., median distance values) of the respective locations (e.g., respective AGPS or GPS locations) of those respective communication devices. It is to be appreciated and understood that, while, in some embodiments, the median distance can be utilized to estimate the location of the node, in other embodiments, the estimator component 122 can utilize the average or mean distance value, or another desired type of mathematically derived distance value, to estimate the location of the node based at least in part on the respective locations (e.g., respective AGPS or GPS locations) of those respective communication devices.

If the estimator component 122 determines that there is not a sufficient number (e.g., there is less than the defined threshold number of) communication devices located at or within the defined threshold distance of the node (e.g., base station 110), the estimator component 122 can determine that the smallTA algorithm is not to be utilized, and instead, the linear regression algorithm is to be utilized, to estimate the location of the node. Accordingly, the estimator component 122 can apply the linear regression algorithm to estimate the location of the node (e.g., base station 110) based at least in part on the respective TA measurement data and/or the respective location data (e.g., AGPS or GPS location data) associated with the respective communication devices and the linear regression algorithm. When the estimator component 122 (e.g., ML engine of the estimator component 122) is employing the linear regression algorithm, the node location $(S_x, S_y)$ can be the coefficients of linear equations formed by pairs of communication device locations and their respective distances to the node. Since there often can exist many pairs of communication devices to be considered with respect to a node, the estimator component 122 can apply robust linear regression to remove outlier location-related data and mitigate (e.g., neutralize, reduce, or minimize) noise or errors that may exist in the TA measurement data and/or location data (e.g., AGPS or GPS location data).

Figure 4:
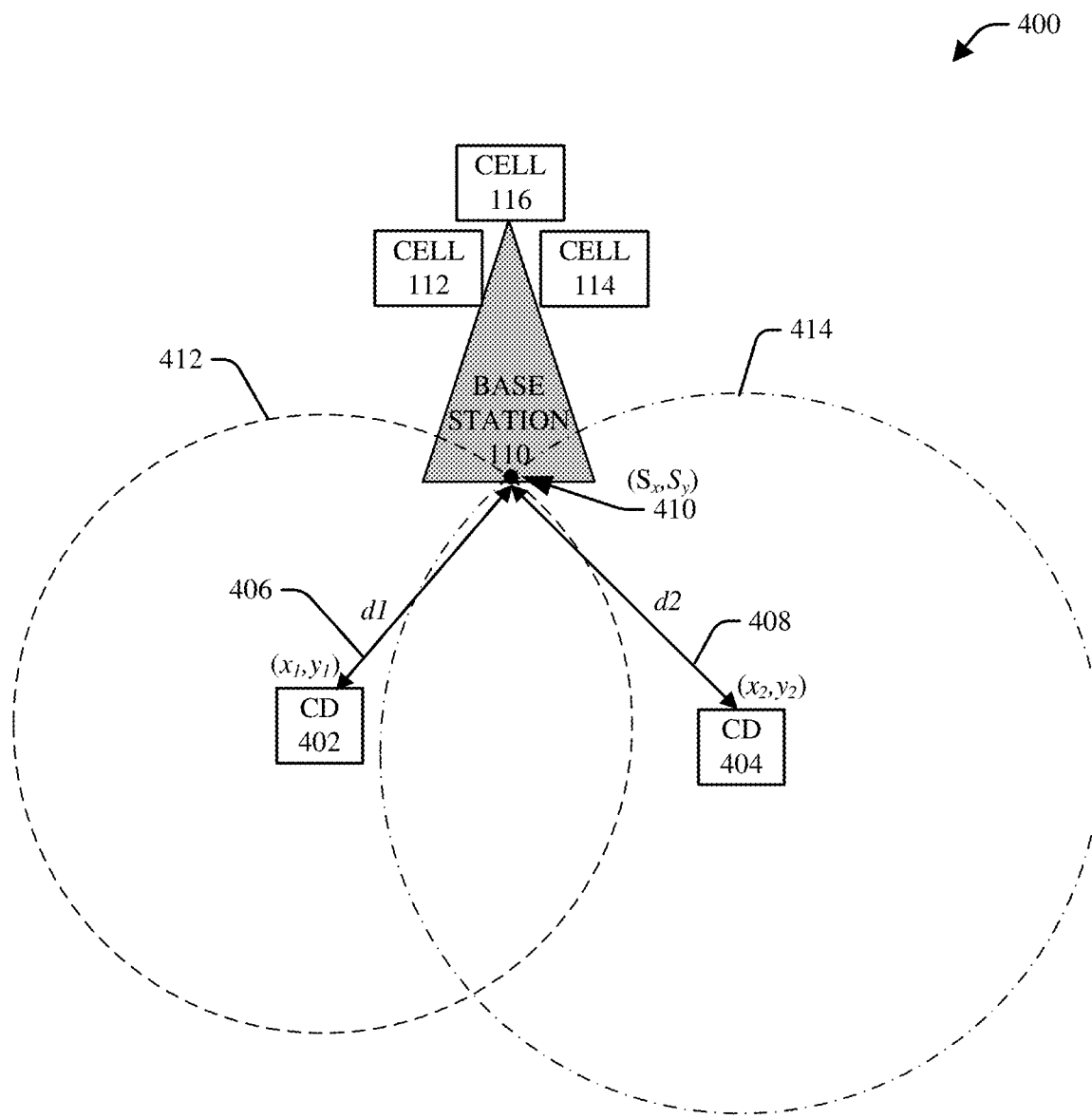
FIG. 4 illustrates a diagram of an example communication device pair distribution in relation to a node associated with one or more cells, in accordance with various aspects and embodiments of the disclosed subject matter.

Turning briefly to FIG. 4 (along with FIGS. 1, 2, and 3), FIG. 4 illustrates a diagram of an example communication device pair distribution 400 in relation to a node (e.g., base station) associated with one or more cells, in accordance with various aspects and embodiments of the disclosed subject matter. The example communication device pair distribution 400 depicts one pair of communication devices, communication devices 402 and 404, of a plurality of communication devices that can be associated with a node (e.g., base station 110) that can comprise or be associated with one or more cells (e.g., cells 112, 114, and/or 116).

For the pair of communication devices 402 and 404, the estimator component 122 can determine that communication device 402 is located at $(x_1, y_1)$ based at least in part on the result of analyzing the location-related data (e.g., TA measurement data and/or AGPS or GPS data) associated with the communication device 402, and can determine that communication device 404 is located at $(x_2, y_2)$ based at least in part on the result of analyzing the location-related data associated with the communication device 404. Each pair of communication devices (e.g., communication devices 402 and 404) can form a linear equation of the node location, wherein $(S_x, S_y)$ can be the node location, $(x_i, y_i)$, with i=1, 2, can be any pair of device locations of any pair of communication devices of the plurality of communication devices, and d1 (e.g., d1 406) and d2 (e.g., d2 408) can be the respective distances derived from the TA measurement data associated with the respective communication devices of the device pair to the node (e.g., serving node).

The estimator component 122 can perform similar linear regression analysis calculations for all or a desired portion of the various pairs of communication devices associated with the node (e.g., base station 110) to facilitate estimating the location of the node. The estimator component 122 can estimate the location of the node based at least in part on the respective locations of the respective intersection points (e.g., intersection point 410) of the respective pairs of communication devices associated with the node, in accordance with the linear regression algorithm. With respect to the pair of communication devices under consideration, the estimator component 122 can determine or estimate the location of the node (e.g., base station 110) to be at the intersection point 410 of two circles 412 and 414 that can be respectively centered at the respective locations of the communication devices 402 and 404 of the device pair, with respective radii that can be equal to the respective distances d1 406 and d2 408 of the respective communication devices 402 and 404 to the node. These parameters can satisfy the following example equations:

$$(x_1-s_x)^2+(y_1-s_y)^2=d_1^2;$$ Eq. (1)

$$(x_2-s_x)^2+(y_2-s_y)^2=d_2^2;$$ Eq. (2)

Eq.(1)-Eq.(2):

$$(x_2-x_1)s_x+(y_2-y_1)s_y=\tfrac{1}{2}[(d_2^2-d_1^2)+(x_2^2-x_1^2)+(y_2^2-y_1^2)],$$ Eq. (3)

and where $\beta_x s_x+\beta_y s_y=C,$ Eq. (4)

wherein there can be one sample of $(\beta_x, \beta_y, C)$ for each pair of communication device locations (e.g., $(x_i, y_i)$, with i=1, 2).

With further regard to FIGS. 1 and 2, the CLC 120 can estimate the respective locations of the one or more cells (e.g., cell 112, cell 114, and/or cell 116, . . . ) of the node (e.g., base station 110) to be the estimated location of the node. For instance, the CLC 120 can determine that the estimated location of each cell (e.g., cell 112, cell 114, cell 116) associated with a particular node (e.g., base station 110) can be the estimated location of the node (e.g., as determined by the smallTA algorithm or the linear regression algorithm).

For each cell (e.g., cell 112, cell 114, or cell 116, . . . ) of each node (e.g., base station 110), with the location of the node estimated by the estimator component 122 (e.g., employing the ML engine), the CLC 120 can determine that the estimated location of the cell is the estimated location of the node. For each cell (e.g., cell 112, cell 114, or cell 116, . . . ), the CLC 120, employing the validator component 124, can validate or verify the estimated location of the cell and/or a recorded location(s) of the cell to facilitate determining whether the estimated node location and/or recorded node location(s) is accurate (e.g., sufficiently accurate) or not, or is uncertain, in accordance with the defined cell location management criteria, as indicated at reference numeral 208 (cell location validation) of the cell location estimation and validation process 200. To perform the cell location validation 208, the validator component 124 can utilize one or more various types of measurements to validate (e.g., determine the accuracy of) a location of a cell. The validator component 124 can employ a set of rules (e.g., set of validation rules) to facilitate validating a location of a cell, wherein one or more rules of the set of rules can be applied to one or more measurement results to facilitate determining an accuracy level of a potential cell location (e.g., an estimated cell location, or a recorded cell location obtained from a data source as stored in the cell location pool of the cell location pool component 118), in accordance with the defined cell location management criteria.

In some embodiments, to facilitate validating the location of a cell (e.g., cell 112, cell 114, or cell 116), the validator component 124 can determine (e.g., calculate) a distance difference (DD) as a function of a first distance, D1, between a potential location (e.g., an estimated location, or a recorded location from a data source) of the cell and a location of a communication device (e.g., communication device 104, communication device 106, or communication device 108) and a second distance, D2, which can be a measurement distance (e.g., converted from TA measurement data) between a true location of the cell and the communication device, as more fully described herein. It is to be appreciated and understood that the first distance, D1, and the second distance, D2, utilized to determine a DD are different from the distances d1 and d2 (e.g., distances d1 406 and d2 408 of FIG. 4) utilized during the linear regression analysis. The validator component 124 can determine the DDs with regard to all or a desired portion of the communication devices associated with (e.g., served by, observed by, or otherwise associated with) the cell. If the cell location information (e.g., from a recorded cell location of a data source, or from an estimated cell location), is at the true cell location or is very close to the true cell location, the DD can be expected to be close to 0. Thus, if there are a lot of small DD values associated with a cell, this can be a good indicator that the cell location information (e.g., recorded cell location, or estimated cell location) is acceptably reliable (e.g., acceptably accurate).

Figure 5:
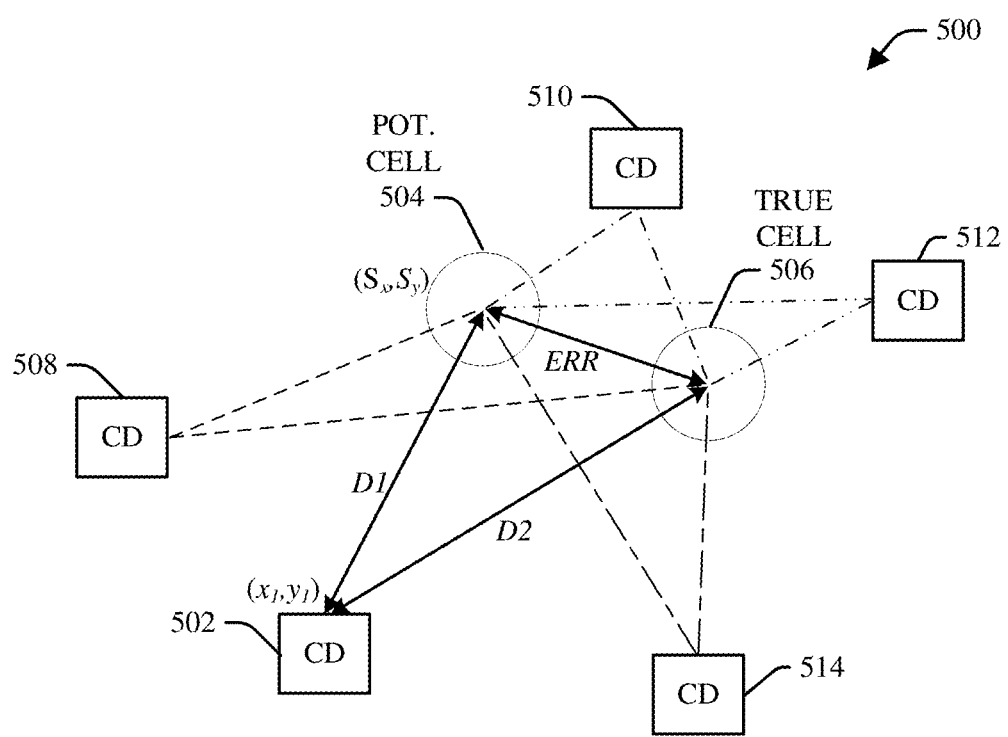
FIG. 5 depicts a diagram of an example distance difference (DD) of a first distance between a potential location (e.g., estimated location or recorded location) of a cell and a location of a communication device and a second distance that can be a measurement distance between a true location of the cell and the communication device, in accordance with various aspects and embodiments of the disclosed subject matter.

Referring briefly to FIG. 5 (along with FIGS. 1 and 2), FIG. 5 depicts a diagram of example distance differences (DDs) 500 of respective first distances between a potential location (e.g., estimated location or recorded location) of a cell and respective locations of communication devices and respective second distances that can be respective measurement distances (e.g., converted from TA measurement data) between a true location of the cell and the respective communication devices, in accordance with various aspects and embodiments of the disclosed subject matter. In some embodiments, to facilitate cell location validation 208 of a location of a cell (e.g., cell 112, cell 114, or cell 116, . . . of FIG. 1), for each communication device (e.g., communication device 104, communication device 106, and/or communication device 108 of FIG. 1) associated with the cell, the validator component 124 can determine a DD between the reported distance from the communication device to the cell based on TA measurement data and the determined (e.g., calculated) distance from a location (x1, y1) of a communication device 502 derived from location data (e.g., AGPS or GPS) to the potential location 504 (Sx, Sy) of the cell (POT. CELL) in the record (e.g., a recorded cell location of a data source as stored in the cell location pool of the cell location pool component 118, or the estimated cell location determined by the estimator component 122).

If, for instance, all data sources for cell location (e.g., estimated cell location and a recorded cell location) of a cell are accurate, the reported distance from a communication device to the cell based on TA measurement data should match the determined (e.g., calculated) distance from a location (x1, y1) of the communication device 502 derived from location data (e.g., AGPS or GPS) to the potential location 504 (Sx, Sy) of the cell in the record (e.g., a recorded cell location of a data source, or the estimated cell location). The disclosed subject matter can define an error, ERR, as being the distance between a potential cell location 504 (Sx, Sy) (e.g., recorded cell location or estimated cell location) of a cell and the true location 506 (TRUE CELL) of the cell.

The validator component 124 can determine (e.g., calculate) a DD for each communication device record (e.g., TA measurement data) associated with each communication device (e.g., communication device 502, communication device 508, communication device 510, communication device 512, and/or communication device 514) that is associated with the cell 506 (e.g., cell at true location), for example, as follows. The validator component 124 can determine (e.g., calculate) a first distance, D1, between the communication device-reported location (x1, y1) (e.g., AGPS or GPS location) of the communication device 502 to a potential cell location 504 (Sx, Sy) (e.g., estimated cell location or a recorded cell location obtained from a data source of the cell location pool). In some embodiments, the validator component 124 can determine the first distance, D1, with regard to communication device 502 using Eq. (5) as follows:

$$D1=\sqrt{(x_1-s_x)^2+(y_1-s_y)^2}.\qquad\text{Eq. (5)}$$

The validator component 124 also can determine respective first distances, D1 s, for the other communication devices (e.g., 508, 510, 512, and/or 514), as a function of the respective communication device-reported locations of the other communication devices and the potential cell location 504, in a manner similar to that described herein with regard to communication device 502.

The validator component 124 also can determine (e.g., calculate) a second distance, D2, with regard to the communication device 502 as a function of the TA measurement data associated with the communication device and the cell (at the true cell location) and the multipath effect (e.g., D2=TA−multipath effect). In some embodiments, the validator component 124 can determine the second distance, D2, with regard to communication device 502 using Eq. (6) as follows:

$$D2=TA*78\text{ m-multipath effect},\qquad\text{Eq. (6)}$$

wherein TA can be the TA measurement data as converted to the unit of meters, and 78 m can be a function value, wherein the multipath effect can relate to signals (e.g., radio signals) communicated between a communication device and a cell being propagated in different ways and across different distances due in part to the scattering and reflecting of signals, and wherein it can be desirable to take the multipath effect into account when determining the second distance, D2, because the multipath effect can affect or impact the determination of the second distance, D2, using the TA measurement data. The validator component 124 also can determine respective second distances, D2s, for the other communication devices (e.g., 508, 510, 512, and/or 514), as a function of the respective TA measurement data associated with the respective other communication devices and the cell 506 at the true cell location, the respective multipath effects associated with the respective other communication devices, and the function value, in a manner similar to that described herein with regard to communication device 502.

The validator component 124 can determine the DDs associated with each potential cell location 504 (Sx, Sy) (e.g., estimated cell location or a recorded cell location) of the cell as a function of the first distance, D1, and the second distance, D2, with respect to each communication device (e.g., 502, 508, 510, 512, and/or 514). In some embodiments, the validator component 124 can determine the DD for each potential cell location 504 (Sx, Sy) with respect to each communication device using Eq. (7):

$$DD=\text{abs}(D1-D2)\leq ERR,\qquad\text{Eq. (7)}$$

wherein abs can be an absolute value function that can take the absolute value of D1-D2, and wherein abs(D1-D2) can be less than or equal to ERR. If the potential cell location (e.g., position) 504 (Sx, Sy) is accurate, ERR=0, and accordingly, D1=D2=TA−multipath effect.

The validator component 124 can determine the DD for each communication device record (e.g., each record from each data source in the cell location pool, and the record for the estimated cell location) associated with each communication device (e.g., 502, 508, 510, 512, and/or 514) under consideration.

In certain embodiments, to facilitate validating the location (e.g., potential location) of a cell (e.g., cell 506), the validator component 124 can utilize DD values associated with the communication devices (e.g., 502, 508, 510, 512, and/or 514) and the cell to determine respective upper bound values (UB) of ERR of communication devices (e.g., 502, 508, 510, 512, and/or 514) associated with (e.g., served by, observed by, or otherwise associated with) the cell, wherein the ERR can be the distance between a potential cell location 504 (Sx, Sy) (e.g., recorded cell location or estimated cell location) of a cell and the true location 506 of the cell. For each communication device (e.g., 502, 508, 510, 512, and/or 514) associated with a cell, a UB of ERR, with respect to a communication device and the cell, can be determined as a function of the first distance, D1, TA measurement data (as converted to meters), and a defined factor (e.g., the function value). For example, a UB of ERR, with respect to a communication device and the cell, can be determined (e.g., calculated) using the following Eq. (8):

$$UB=\min(D1+TA*78\text{ m})\qquad\text{Eq. (8)}$$

of communication devices associated with (e.g., served by) the cell, wherein min can be the minimum function. From triangle inequality, it can be observed that ERR≤D1+D2≤D1+TA*78 m for any communication device associated with (e.g., served by) the cell, and ERR≤min(D1+TA*78 m). Also, D1+D1≥ERR for each communication device record observed.

With further regard to FIGS. 1 and 2, and with further regard to performing cell location validation 208, the validator component 124 can determine (e.g., calculate) the respective UBs of ERR associated with the respective communication devices (e.g., communication device 104, communication device 106, and/or communication device 108, . . . ) associated with the cell (e.g., cell 112, cell 114, or cell 116) based at least in part on (e.g., as a function of) respective first distances, respective D1 s, and respective TA measurement data (and a defined distance factor) associated with the respective communication devices, as more fully described herein. The validator component 124 also can determine whether the respective UBs of ERR associated with a first portion of the respective communication devices in a first defined percentile (e.g., a bottom or lower end percentile, such as 1 percentile, or another desired percentile value) satisfy the first defined threshold distance associated with the first rule, in accordance with the defined cell location management criteria.

If the validator component 124 determines that the respective UBs of ERR associated with the first portion of the respective communication devices (e.g., communication device 104, communication device 106, and/or communication device 108, . . . , if in the first portion) in the first defined percentile satisfy the first defined threshold distance (e.g., 150 meters, or other desired distance greater than or less than 150 meters) associated with a first rule of the set of rules, in accordance with the defined cell location management criteria, the validator component 124 can determine that the potential (e.g., recorded or estimated) location of the cell is good and can flag the potential location of the cell as being good (or with a similar flag, such as an accurate flag).

If, instead, the validator component 124 determines that one or more of the respective UBs of ERR associated with the first portion of the respective communication devices (e.g., communication device 104, communication device 106, and/or communication device 108, . . . , if in the first portion) in the first defined percentile do not satisfy the first defined threshold distance associated with the first rule, the validator component 124 can determine that the potential location of the cell (e.g., cell 112, cell 114, or cell 116) is not to be labeled or flagged as good and is not to be tagged as accurate. The validator component 124 also can determine that further analysis is to be performed to facilitate determining whether the potential cell location is to be flagged as fine, is to be flagged as bad, or is to be flagged as uncertain, based at least in part on one or more of the rules (e.g., first rule, second rule, and/or third rule) of the set of rules.

If the validator component 124 determines that the first rule is not satisfied with regard to the UB of ERR, the validator component 124 can analyze (e.g., compare) the respective DDs associated with a second portion of the respective communication devices (e.g., communication device 104, communication device 106, and/or communication device 108, . . . , if in the second portion) in a second defined percentile (e.g., another lower end percentile, such as the $25^{th}$ percentile, which can be the bottom 25% of the respective DDs associated with the respective communication devices, or another desired lower end percentile value) satisfy the second defined threshold distance associated with the second rule. Based at least in part on the analysis results, the validator component 124 can determine whether the respective DDs associated with the second portion of the respective communication devices in the second defined percentile satisfy (e.g., are less than or equal to) the second defined threshold distance associated with the second rule. In accordance with various embodiments, the second defined threshold distance can be the same as the first defined threshold distance (e.g., 150 meters (or other desired distance)) or can be different from the first defined threshold distance, as indicated or specified by the defined cell location management criteria.

In some embodiments, if the validator component 124 determines that the respective DDs associated with the second portion of the respective communication devices in the second defined percentile satisfy the second defined threshold distance associated with the second rule, the validator component 124 can perform further analysis to facilitate validating the location of the cell (e.g., cell 112, cell 114, or cell 116, . . . ). For instance, the validator component 124 can perform a cross validation of the estimated location of the cell and (e.g., vis-à-vis, or in relation to) one or more recorded locations of the cell obtained from one or more data sources (e.g., and stored in the cell location pool component 118). Whether the validator component 124 flags a potential (e.g., estimated or recorded) cell location of the cell as good or fine can be determined based at least in part on such cross validation.

For example, for the cell (e.g., cell 112, cell 114, or cell 116, . . . ), the validator component 124 can determine a difference between a recorded cell location (R) obtained from a data source (e.g., for each recorded cell location for each data source) and the estimated cell location (E) of the cell (wherein such difference also can be referred to as D_RE). Since the estimator component 122 (e.g., employing the ML engine) can estimate the cell location based on network measurements (e.g., TA measurement data, AGPS or GPS data), the estimated cell location can be independent of the cell location(s) recorded in another data source(s) (e.g., as stored in the cell location pool in the cell location pool component 118). If D_RE is sufficiently small (e.g., less than a defined threshold distance), it can be relatively good evidence that both the estimated location of the cell and the recorded location of the cell from the data source are both reliable (e.g., sufficiently accurate in establishing the location of the cell).

The validator component 124 can determine the distance between a recorded location of the cell (e.g., cell 112, cell 114, or cell 116, . . . ) and the estimated location of the cell, wherein the recorded location can be obtained from the cell location pool component 118, and wherein can perform such a D_RE determination with regard to one or more recorded locations from one or more data sources (e.g., ATOLL and/or CSSNG, . . . ), as stored in the cell location pool component 118. With regard to each of the one or more D_REs and the associated one or more recorded locations, the validator component 124 can compare the distance between the recorded location and the estimated location of the cell to the first defined threshold distance (e.g., 150 meters, or other desired distance greater than or less than 150 meters), which can be indicated or specified by the first rule of the set of rules, in accordance with the defined cell location management criteria. Based at least in part on the results of the comparison, the validator component 124 can determine whether the distance between the recorded location and the estimated location of the cell (the D_RE) satisfies the first defined threshold distance associated with the first rule.

If the validator component 124 determines that the distance between the recorded location and the estimated location of the cell (the D_RE) satisfies the first defined threshold distance, based on such determination and the determination that the first rule is satisfied with regard to the UB of ERR, the validator component 124 can determine that the recorded location and the estimated location are good and can flag the recorded location and the estimated location as good. If the recorded location and the estimated location of the cell are determined to be good and flagged as good, the cell location validation 208 can be complete with regard to that particular cell.

If the validator component 124 determines that the distance between the recorded location and the estimated location of the cell (the D_RE) does not satisfy (e.g., is not less than or equal to) the first defined threshold distance, in accordance with the first rule, the validator component 124 can determine that the potential (e.g., recorded or estimated) location of the cell (e.g., cell 112, cell 114, or cell 116, . . . ) is fine (e.g., not sufficiently accurate, but not bad or uncertain either) and can flag that particular cell location as fine (or acceptable, or with another descriptive term that can indicate fine or acceptable).

With further regard to the DDs, if, instead, the validator component 124 determines that one or more of the respective DDs associated with the second portion of the respective communication devices (e.g., communication device 104, communication device 106, and/or communication device 108, . . . , if in the second portion) in the second defined percentile do not satisfy the second defined threshold distance associated with the second rule, the validator component 124 can determine that the potential location of the cell is not to be labeled or flagged as fine. The validator component 124 also can determine that further analysis is to be performed to facilitate determining whether the potential cell location is to be flagged as bad (or with another similar term that can indicate bad or unacceptable) or is to be flagged as uncertain, based at least in part on another rule (e.g., third rule) of the set of rules.

In response to determining that the potential location (e.g., recorded location, or estimated location) of the cell (e.g., cell 112, cell 114, or cell 116) is not to be labeled or flagged as fine (or good), the validator component 124 can determine the number of communication devices in the second portion of communication devices in the second defined percentile, based at least in part on the analysis results. Further, based at least in part on the analysis results, the validator component 124 can determine whether the number of communication devices in the second portion of communication devices in the second defined percentile satisfies (e.g., meets or exceeds) the defined threshold number (e.g., 30 or other desired number less than or greater than 30) of communication devices associated with the third rule. The defined threshold number can be indicated or specified by the defined cell location management criteria.

If the validator component 124 determines that the respective DDs associated with the second portion of the respective communication devices in the second defined percentile satisfy the second defined threshold distance associated with the second rule, the validator component 124 can determine that the potential (e.g., recorded or estimated) location of the cell (e.g., cell 112, cell 114, or cell 116) is bad or unacceptable, and can flag the potential location of the cell as being bad or unacceptable. If, instead, the validator component 124 determines that the number of communication devices in the second portion of communication devices in the second defined percentile does not satisfy (e.g., is not greater than or equal to) the defined threshold number associated with the third rule, the validator component 124 can determine that the potential location of the cell is to be flagged as uncertain.

The validator component 124, by determining the UBs of ERR and the DDs at cell level, as opposed to node level, can identify instances where a cell, while associated with a node, is not necessarily located at the node or co-located with other cells associated with (e.g., co-located at) the node. Thus, even though the CLC 120 estimates the location of the node and, accordingly, estimates the locations of the cells associated with the node (e.g., at node level), the validator component 124 can determine whether one or more of the cells are not actually co-located with the node and other cells, to facilitate desirably (e.g., accurately, or at least more accurately) determine the respective locations of respective cells associated with the node, and desirably (e.g., accurately) determine the validation status(es) of one or more potential (e.g., estimated or recorded) locations of each cell.

With the cell location validation 208 performed, with regard to each cell (e.g., cell 112, cell 114, or cell 116, . . . ) of each node, based at least in part on the results of the cell location validation 208, the validator component 124 can perform cell location tagging 210 to tag the one or more locations (e.g., estimated cell location, and/or one or more recorded cell locations) of the cell with an appropriate tag (e.g., tag that can correspond to the cell location validation result and associated flag), in accordance with the cell location management criteria. For instance, if the validator component 124 determines that a particular cell location (e.g., an estimated cell location, or a recorded cell location from a particular data source) is sufficiently accurate and flags that particular cell location as good (or accurate, or with another descriptive term that indicates good or accurate), the validator component 124 can tag that particular cell location as accurate (or with another suitably equivalent term), wherein, for example, the validator component 124 can assign or associate (e.g., link) a tag of accurate (or another suitably equivalent term) to or with the particular cell location. If the validator component 124 determines that a particular cell location is fine (e.g., not sufficiently accurate, but not bad or uncertain either) and flags that particular cell location as acceptable (or fine, or with another descriptive term that indicates fine or acceptable), the validator component 124 can tag that particular cell location as acceptable (or with another suitably equivalent term), wherein, for example, the validator component 124 can assign or associate (e.g., link) a tag of acceptable (or another suitably equivalent term) to or with that particular cell location. In some embodiments, with regard to a particular cell (e.g., cell 112), the validator component 124 can determine and select the best (e.g., most accurate) cell location and associated best data source of all of the cell locations and associated data sources (e.g., estimated cell location from the estimator component 122, and all of the one or more recorded cell locations from one or more data sources) for the particular cell, and can flag that best cell location and associated best data source as fine and tag them as acceptable (or with another descriptive term that indicates fine or acceptable).

If the validator component 124 determines that a particular cell location is bad (e.g., not sufficiently accurate or acceptable, and not uncertain) and flags that particular cell location as bad (or inaccurate, or with another descriptive term that indicates bad), the validator component 124 can tag that particular cell location as inaccurate (or with another suitably equivalent term), wherein, for example, the validator component 124 can assign or associate (e.g., link) a tag of inaccurate (or another suitably equivalent term) to or with that particular cell location. In some embodiments, if with regard to a particular cell (e.g., cell 112), the validator component 124 determines that all of the data sources (e.g., estimated cell location from the estimator component 122, and all of the one or more recorded cell locations from one or more data sources) are bad, the validator component 124 can tag all of those cell locations and associated data sources as being inaccurate (or with another suitably equivalent term). If the validator component 124 determines that a particular cell location is uncertain (e.g., there is not enough certainty to indicate whether the cell location is accurate, acceptable, or bad) and flags that particular cell location as uncertain (or with another descriptive term that indicates uncertain), the validator component 124 can tag that particular cell location as uncertain (or with another suitably equivalent term), wherein, for example, the validator component 124 can assign or associate (e.g., link) a tag of uncertain (or another suitably equivalent term) to or with that particular cell location.

Based at least in part on the tag assigned to or associated with a particular cell location of a particular cell (e.g., cell 112, cell 114, or cell 116), the CLC 120 (e.g., the validator component 124 or another component of the CLC 120) can initiate a cell location investigation 212, a cell location lock 214, or a cell monitoring request 216, with respect to the particular cell location of the particular cell. For instance, for a particular cell location (e.g., cell 112), if the validator component 124 associates a tag of inaccurate with the particular cell location, the CLC 120 can initiate a cell location investigation 212 to have an investigation (e.g., a manual investigation on map, or a physical visit to the particular cell) performed to try to determine the true location of the cell. For example, as part of a cell location investigation 212 to investigate a location of a particular cell, a manual or an automated investigation on map can be performed (e.g., manually or by the CLC 120) by plotting a UE traffic heatmap on a map and plotting the estimated location (e.g., ML estimated location) and recorded cell location(s) of a data source(s) on the map, with respect to the particular cell. If the estimated location is determined to be significantly closer to the UE population (e.g., from the UE traffic heatmap) than the recorded location(s) of the data source(s), it can indicate or suggest that the data source(s) is an issue (e.g., indicate that the data source(s) is in error).

Figure 6:
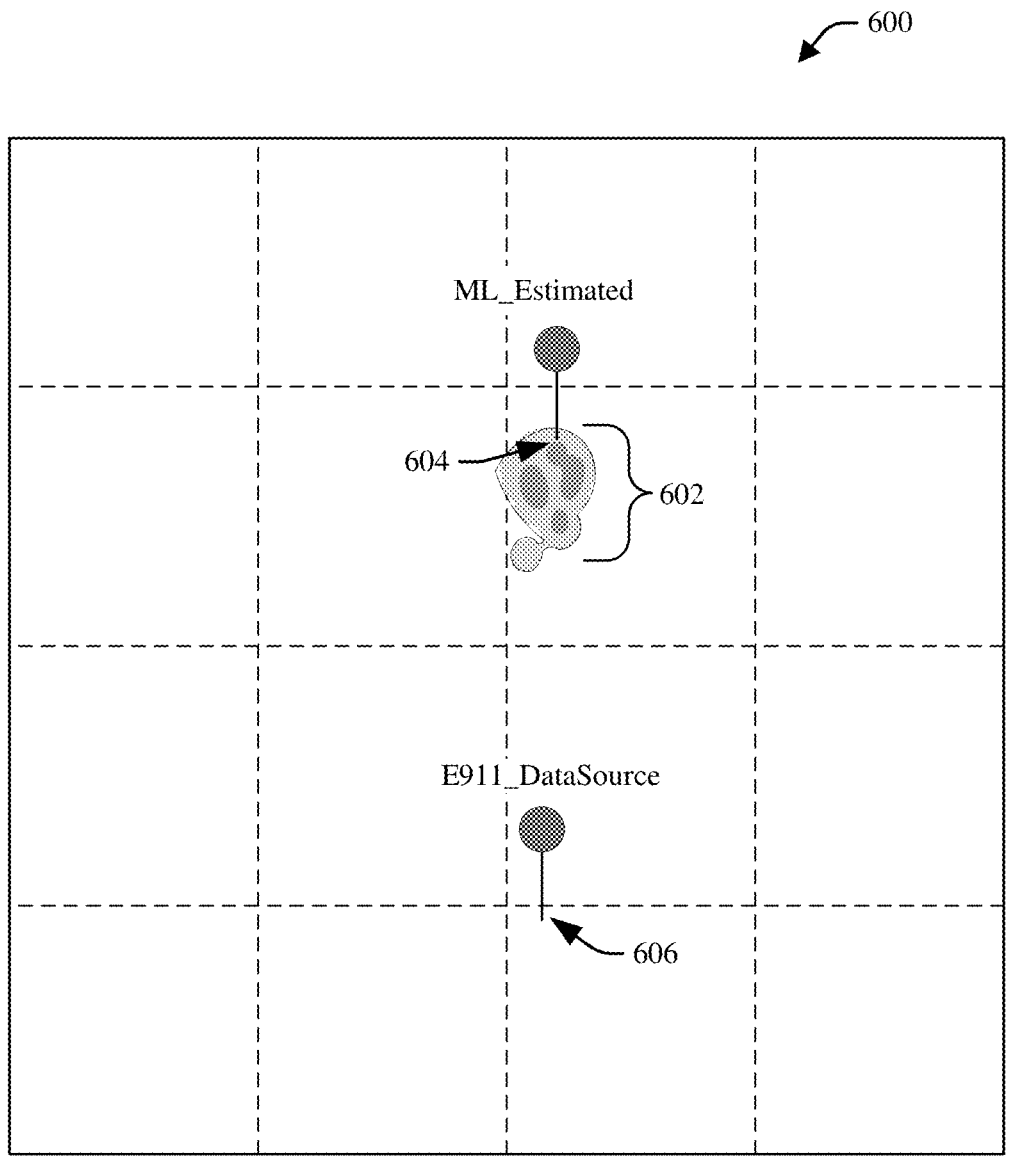
FIG. 6 presents a diagram of an example map plot that can include a UE traffic heatmap, an estimated location of a cell, and a recorded location of the cell that are plotted on the map, in accordance with various aspects and embodiments of the disclosed subject matter.

Referring briefly to FIG. 6 (along with FIGS. 1 and 2), FIG. 6 presents a diagram of an example map plot 600 that can include a UE traffic heatmap, an estimated location of a cell, and a recorded location of the cell that are plotted on the map, in accordance with various aspects and embodiments of the disclosed subject matter. The map plot 600 can be of an example geographical area (e.g., geographical area near a city). The CLC 120 (or another component of or associated the system 100) can plot a UE traffic heatmap on the map plot 600, wherein the UE traffic heatmap can present the population or distribution of UEs 602 (e.g., communication devices) that are determined to have been associated with the cell. The CLC 120 (or another component of or associated the system 100) also can plot the estimated cell location 604 of the cell on the map plot 600. Further, the CLC 120 (or another component of or associated the system 100) can plot a recorded cell location 606 (e.g., E911_DataSource) of the cell on the map plot 600, wherein the recorded cell location 606 can be a cell location that has been obtained from a data source and has been recorded in (e.g., stored in) the cell location pool of the cell location pool component 118. The CLC 120 (or another component of or associated the system 100) or a person can analyze the map plot 600 with the various plots (e.g., 602, 604, 606) thereon. If the CLC 120 (or another component of or associated the system 100) or a person determines that the estimated cell location 604 is significantly closer to the population or distribution of UEs 602 than the recorded cell location 606 on the map plot 600 (as depicted in the map plot 600), the CLC 120 (or another component of or associated the system 100) or the person can determine that the plots (e.g., 602, 604, 606) on the map plot 600 indicate that there may be an issue with the recorded cell location 606 of the data source. Alternatively, if the CLC 120 (or another component of or associated the system 100) or a person determines that the estimated cell location 604 is significantly further away from the population or distribution of UEs 602 than the recorded cell location 606 on the map plot 600, the CLC 120 (or another component of or associated the system 100) or the person can determine that the plots (e.g., 602, 604, 606) on the map plot 600 indicate that there may be an issue with the estimated cell location 604. In this alternative instance, the estimated cell location 604 being located significantly further away from the population or distribution of UEs 602 than the recorded cell location 606 can indicate, for example, that the antenna associated with the cell or node may be located at a different location than the base station tower associated with the cell or node.

An additional or an alternative approach to the manual investigation on map can be to perform a physical visit (e.g., by a person or a device, such as a drone device) to the estimated cell location (e.g., estimated ML location) and the recorded cell location(s) of the data source(s) obtained from the cell location pool component 118 to determine which, if any, of the estimated cell location or the recorded cell location(s) is the accurate (e.g., true) location of the cell. A physical visit to the estimated cell location and recorded cell location(s) of a cell can be more expensive (e.g., more expensive financially, more time consuming, and/or more resource intensive, . . . ) than performing a manual investigation on map with regard to the cell. However, it may be desirable to perform such physical visits with regard to some cells (e.g., a relatively small amount of cells). Major cells typically can be validated with the assistance of the map and UE traffic distribution.

For a particular cell, based at least in part on the results of the manual investigation on map or the physical visit, the CLC 120 (or another component of or associated the system 100) or the person can update the cell location pool of the cell location pool component 118 to store the cell location of the cell as determined from the results of the manual investigation on map or the physical visit, as indicated at reference numeral 218 of the cell location estimation and validation process 200.

With further regard to FIGS. 1 and 2, in response to determining that a particular location (e.g., estimated cell location or a particular recorded cell location of a particular data source) of a cell is accurate (e.g., sufficiently accurate) and is tagged as accurate, the CLC 120 can initiate a cell location lock 214 and can lock or facilitate locking the particular cell location and particular cell with an accurate tag (e.g., or tag them with an equivalent term, such as good) to prevent the particular cell location from being undesirably (e.g., inadvertently or incorrectly, or unexpectedly) changed in the cell location pool of the cell location pool component 118. The CLC 120 can update the cell location pool of the cell location pool component 118 to include the particular location of the cell, which was determined to be accurate, the cell identifier that can identify the particular cell, the lock tag, and/or other desired information regarding the cell in the cell location pool of the cell location pool component 118, as indicated at reference numeral 220 of the cell location estimation and validation process 200.

In some embodiments, in response to determining that a certain location (e.g., estimated cell location or a certain recorded cell location of a certain data source) of a certain cell is uncertain and is tagged as uncertain, the CLC 120 can initiate the cell monitoring request 216 to have the certain cell monitored for a desired (e.g., longer) period of time to collect data (e.g., location-related data) relating to the certain cell (e.g., as indicated at reference numeral 202) and have further analysis performed on such data (e.g., by the CLC 120). For example, based at least in part on the cell monitoring request 216, instead of collecting data for a relatively short time period (e.g., one day), as indicated at reference numeral 202, the CLC 120 can collect data (e.g., location-related data) associated with the certain cell for a relatively longer time period (e.g., one week, one month, or other desired period of time that is longer than the short time period) to facilitate obtaining a desired amount of sample data points (e.g., data points of location-related data) for the certain cell. Collecting such data for a relatively longer period of time can be useful, for example, with regard to cells (e.g., cells in a rural area) that may be associated with a sparse number of communication devices or sparse use by communication devices.

The disclosed subject matter, by employing the CLC 120 to estimate the locations of nodes and associated cells, based at least in part on TA measurement data and location data associated with communication devices, and using the location estimation algorithms (e.g., smallTA algorithm, linear regression algorithm, and/or other machine learning algorithms), and validating potential cell locations of cells (e.g., estimated cell locations and recorded cell locations), based at least in part on TA measurement data and location data associated with communication devices, and using the validation algorithms, such as described herein, can desirably (e.g., accurately, or at least substantially accurately) determine locations of cells. For example, the CLC 120 can desirably and accurately determine or estimate locations of cells with median errors of approximately 50 meters, which can be significantly better than traditional techniques for determining cell locations, as some traditional techniques for determining cell locations can have undesirable errors on the order of 300 meters or more. The disclosed subject matter, by utilizing the CLC 120 and techniques described herein, can involve relatively low resource usage, and the disclosed subject matter can utilize existing network measurements (e.g., TA measurement data, and AGPS, GPS, and/or IoT geolocation data) to estimate and validate cell locations, and thus, can incur no additional or incremental burden on network data collection. Also, the location estimation algorithms and validation algorithms disclosed herein can be relatively easy to implement with relatively low resource usage (e.g., computing resource usage and/or time resource usage).

Further, since the disclosed subject matter can be collected by the CLC 120 consistently from the live communication network 102, the CLC 120 can be able to monitor any change (e.g., adding, moving, or removing) of cells in the communication network 102, and can maintain up-to-date, or at least substantially up-to-date, cell location information of the cells. Furthermore, the disclosed subject matter, by employing the CLC 120 and the associated location estimation algorithms and validation algorithms described herein, can have desirable scalability, and the techniques and algorithms described herein can be scaled up for use with regard to virtually any communication network of virtually any desired size, and with regard to virtually any number of communication networks.

The disclosed subject matter also can have various commercial benefits. For instance, the disclosed subject matter, by employing the CLC 120 and associated techniques and algorithms, as described herein, can provide cost savings (e.g., financial cost savings, time cost saving, and/or other cost savings), as the disclosed subject matter can desirably (e.g., effectively, efficiently, and accurately) estimate cell locations (e.g., by providing ML estimated cell locations) and validate various cell locations and associated cell location data sources. This can significantly reduce the amount of manual labor associated with having people (e.g., technicians, contractors, or other persons) travel to cell sites or potential cell sites. Further, the disclosed subject matter, by employing the CLC 120 and associated techniques and algorithms, as described herein, can enable desirable (e.g., accurate, efficient, and effective) communication network planning and design, and E911 dispatch operations. For instance, the disclosed subject matter can benefit RAN planning and design by providing desirably accurate cell location information, which can reduce the amount of time and the amount of financial cost involved in planning and designing RANs. The disclosed subject matter also can aid and provide benefit in the deployment of the 5G network. Also, with regard to E911 operations, the disclosed subject matter, by providing desirably accurate cell location information, can enable an E911 dispatch team to desirably and accurately identify PSAP call routing/caller location, during an E911 call, and provide desired emergency assistance in a more timely (e.g., quicker) manner.

Figure 7:
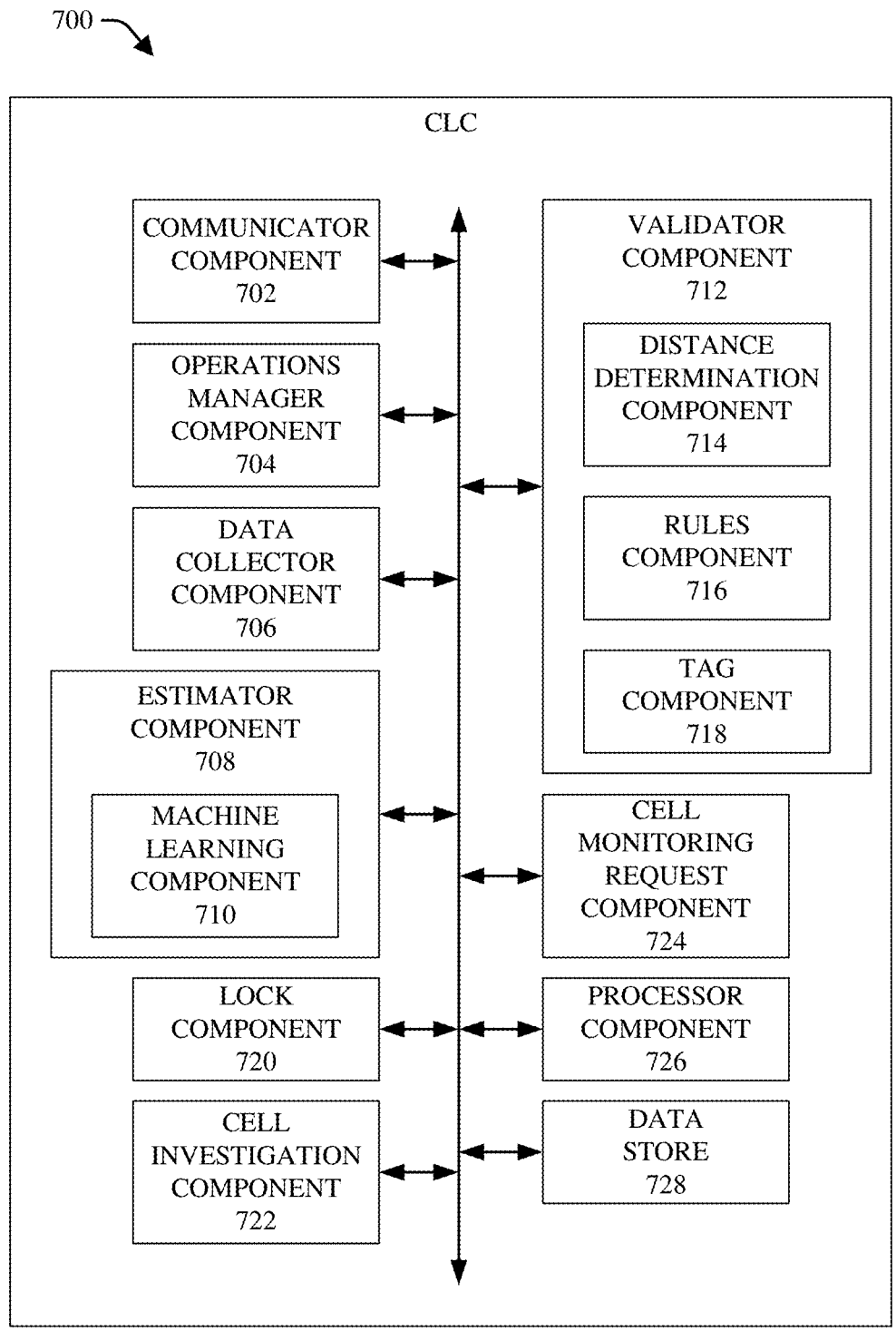
FIG. 7 illustrates a block diagram of the example cell location component, in accordance with various aspects and embodiments of the disclosed subject matter.

FIG. 7 illustrates a block diagram of the example CLC 700, in accordance with various aspects and embodiments of the disclosed subject matter. The CLC 700 can include a communicator component 702, an operations manager component 704, a data collector component 706, an estimator component 708, which can include a machine learning component 710. The CLC 700 also can include a validator component 712 that can include a distance determination component 714, a rules component 716, and a tag component 718. The CLC 700 further can include a lock component 720, a cell investigation component 722, a cell monitoring request component 724, a processor component 726, and a data store 728.

The communicator component 702 can communicate (e.g., transmit and receive) information, including information relating to cell location determinations, such as information relating to estimating locations of cells and validating potential cell locations (e.g., an estimated cell location, or a recorded cell location) of cells. For instance, the communicator component 702 can receive data relating to the location of communication devices (e.g., TA measurement data, AGPS or GPS location data, or IoT geolocation data, . . . ) associated with cells. The communicator component 702 also can transmit information to other components or devices (e.g., cell pool location component, network devices of the communication network, . . . ) associated with the CLC 700. For instance, the communicator component 702 can transmit information relating to a cell location of a cell (e.g., cell location information relating to an estimated cell location and/or a recorded cell location, and/or tag information relating to cell location accuracy and/or locking of cell location information, . . . ), information relating to initiating cell location investigations, and/or information relating to cell monitoring requests, etc.

The operations manager component 704 can control (e.g., manage) operations associated with the CLC 700. For example, the operations manager component 704 can facilitate generating instructions to have components of the CLC 700 perform operations, and can communicate respective instructions to respective components (e.g., communicator component 702, data collector component 706, estimator component 708, . . . , cell investigation component 722, cell monitoring request component 724, processor component 726, and/or data store 728) of the CLC 700 to facilitate performance of operations by the respective components of the CLC 700 based at least in part on the instructions, in accordance with the defined cell location management criteria and cell location management algorithms (e.g., machine learning algorithms, validation algorithms, etc., as disclosed, defined, recited, or indicated herein by the methods, systems, and techniques described herein). The operations manager component 704 also can facilitate controlling data flow between the respective components of the CLC 700 and controlling data flow between the CLC 700 and another component(s) or device(s) (e.g., cell pool location component, network devices of the communication network, data sources, or applications, . . . ) associated with (e.g., connected to) the CLC 700.

The data collector component 706 can collect and aggregate data, including, for example, call trace records (e.g., TA measurement data from call trace records) and location data (e.g., AGPS or GPS location data, or IoT geolocation data) associated with communication devices, and can store such data in the data store 728. The data collector component 706 also can receive or obtain data, such as data relating to recorded cell locations, from the cell location pool component.

The estimator component 708 can estimate cell locations of cells based at least in part on the results of analyzing location-related data associated with communication devices, in accordance with the defined cell location management criteria, as more fully described herein. In accordance with various embodiments, the estimator component 708 can employ a smallTA algorithm, a linear regression algorithm, and/or other machine learning algorithms to facilitate estimating the locations of nodes (e.g., base stations) and cells associated with the nodes. The machine learning component 710 can employ the machine learning techniques and algorithms, including, for example, the linear regression algorithm and/or other techniques and algorithms, such as described herein, to facilitate estimating the locations of the nodes and associated cells, in accordance with the defined cell location management criteria.

The validator component 712 can validate and/or determine the accuracy of estimated locations of cells and recorded locations of cells (e.g., obtained from the cell location pool component), based at least in part on the results of analyzing the estimated cell locations, recorded cell locations, and/or location-related data, in accordance with the defined cell location management criteria and associated algorithms (e.g., validation algorithms), as more fully described herein. The validator component 712 can employ the distance determination component 714 to determine (e.g., calculate) D_REs, DDs, and/or UBs of ERR, where such determinations can be utilized to facilitate determining how accurate a potential cell location (e.g., estimated cell location or recorded cell location) is. The validator component 712 can utilize the rules component 716 to implement (e.g., apply and/or enforce) a set of rules and respective threshold levels (e.g., defined threshold distances, defined threshold DD percentile value, and/or defined threshold UB percentile value) associated with respective rules, such as more fully described herein.

The tag component 718 can associate (e.g., link or assign) respective tags with respective cell location information (e.g., estimated cell location information or recorded cell location information) based at least in part on the respective validation results of respective cell location validations performed with regard to respective potential cell locations by the validator component 712. For instance, if a potential cell location is validated and flagged as good, the tag component 718 can associate an accurate tag with the potential cell location; if a potential cell location (e.g., the best or most accurate cell location of those under evaluation) is validated and flagged as fine, the tag component 718 can associate an acceptable tag with the potential cell location; if a potential cell location(s) is validated and flagged as bad (e.g., if all of the potential cell locations of a cell are determined to be bad), the tag component 718 can associate an inaccurate tag with the potential cell location(s); or if a potential cell location(s) is validated and flagged as uncertain (e.g., if there is not enough data to support a decision regarding cell location validation), the tag component 718 can associate an uncertain tag with the potential cell location(s). If a potential cell location is tagged as accurate, the tag component 718 also can associate a lock tag with the potential cell location to facilitate locking the cell location information to facilitate preventing any undesired (e.g., unwanted, inadvertent, or unexpected) changes to the cell location information.

The lock component 720, in conjunction with the tag component 718, can facilitate locking cell location information for a potential cell location (e.g., estimated cell location information or recorded cell location information) that has been determined to be and tagged as accurate based at least in part on the results of the cell location validation. The lock component 720 can lock the cell location information or can indicate, in part via the lock tag, that the cell location information is to be locked to prevent undesired changes. If changes to the cell location information are desired (e.g., when a cell is removed from a location or moved to another location), the lock component 720, or another component or device, can unlock the cell location information to facilitate making desired changes to the cell location information for the cell.

The cell investigation component 722 can initiate a cell investigation of a location of a cell, for example, when the cell location has been tagged as bad, based at least in part on the results of the cell location validation performed with regard to the cell by the validator component 712. The cell investigation can include a manual or automated investigation on map or a physical visit to the estimated cell location, recorded cell location, or other potential location of the cell, such as described herein. Based at least in part on the results of the cell investigation of the location of a cell, the cell investigation component 722 can be employed to provide update information regarding the cell location of the cell to the cell location pool component, and the cell location pool component can update the cell location information for the cell based at least in part on such update information. For instance, if the cell investigation results in an accurate, or a more accurate or complete, location of a cell, the update information from the cell investigation can include updated cell location information regarding the accurate, or more accurate or complete, cell location.

The cell monitoring request component 724 can initiate a cell monitoring request, for example, if a cell location of a cell has been tagged as uncertain, to have the cell monitored for a desired (e.g., longer) period of time to collect data (e.g., additional location-related data) relating to the cell and have further analysis performed on such data (e.g., by the CLC 700). In response to the cell monitoring request, the CLC 700 and/or other components or devices (e.g., base station) can obtain or collect additional data, including location-related data, associated with communication devices that are associated with the cell or associated node (e.g., base station) for a desired period of time. The CLC 700 can analyze the additional data to facilitate estimating the location of the cell and validating the location of the cell, in accordance with the defined cell location management criteria.

The processor component 726 can work in conjunction with the other components (e.g., communicator component 702, data collector component 706, estimator component 708, . . . , cell investigation component 722, cell monitoring request component 724, and/or data store 728) to facilitate performing the various functions of the CLC 700. The processor component 726 can employ one or more processors, microprocessors, or controllers that can process data, such as information relating to communication devices, call trace records (e.g., TA measurement data from call trace records), location data (e.g., AGPS or GPS location data, and/or IoT geolocation data) associated with communication devices, network conditions, cell location estimation, cell location validation, metadata, parameters, defined threshold levels, rules associated with cell location validation, traffic flows, policies, defined cell location management criteria, algorithms (e.g., smallTA algorithm, linear regression algorithm, machine learning algorithms, validation algorithms, etc.), protocols, interfaces, tools, and/or other information, to facilitate operation of the CLC 700, as more fully disclosed herein, and control data flow between the CLC 700 and other components (e.g., a base station or other network component or device of the communication network, cell location pool component and/or data sources, applications, . . . ) associated with the CLC 700.

The data store 728 can store data structures (e.g., user data, metadata), code structure(s) (e.g., modules, objects, hashes, classes, procedures) or instructions, information relating to communication devices, call trace records (e.g., TA measurement data from call trace records), location data (e.g., AGPS or GPS location data, and/or IoT geolocation data) associated with communication devices, network conditions, cell location estimation, cell location validation, metadata, parameters, defined threshold levels, rules associated with cell location validation, traffic flows, policies, defined cell location management criteria, algorithms (e.g., smallTA algorithm, linear regression algorithm, machine learning algorithms, validation algorithms, etc.), protocols, interfaces, tools, and/or other information, to facilitate controlling operations associated with the CLC 700. In an aspect, the processor component 726 can be functionally coupled (e.g., through a memory bus) to the data store 728 in order to store and retrieve information desired to operate and/or confer functionality, at least in part, to the communicator component 702, operations manager component 704, data collector component 706, estimator component 708, validator component 712, lock component 720, cell investigation component 722, cell monitoring request component 724, and data store 728, etc., and/or substantially any other operational aspects of the CLC 700.

Described herein are systems, methods, articles of manufacture, and other embodiments or implementations that can facilitate estimating locations of cells and validating cell locations (e.g., estimated cell locations and/or recorded cell locations from data sources) of cells of a communication network, as more fully described herein. The estimating locations of cells and validating cell locations of cells of a communication network, and/or other features of the disclosed subject matter, can be implemented in connection with any type of device with a connection to, or attempting to connect to, the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 8:
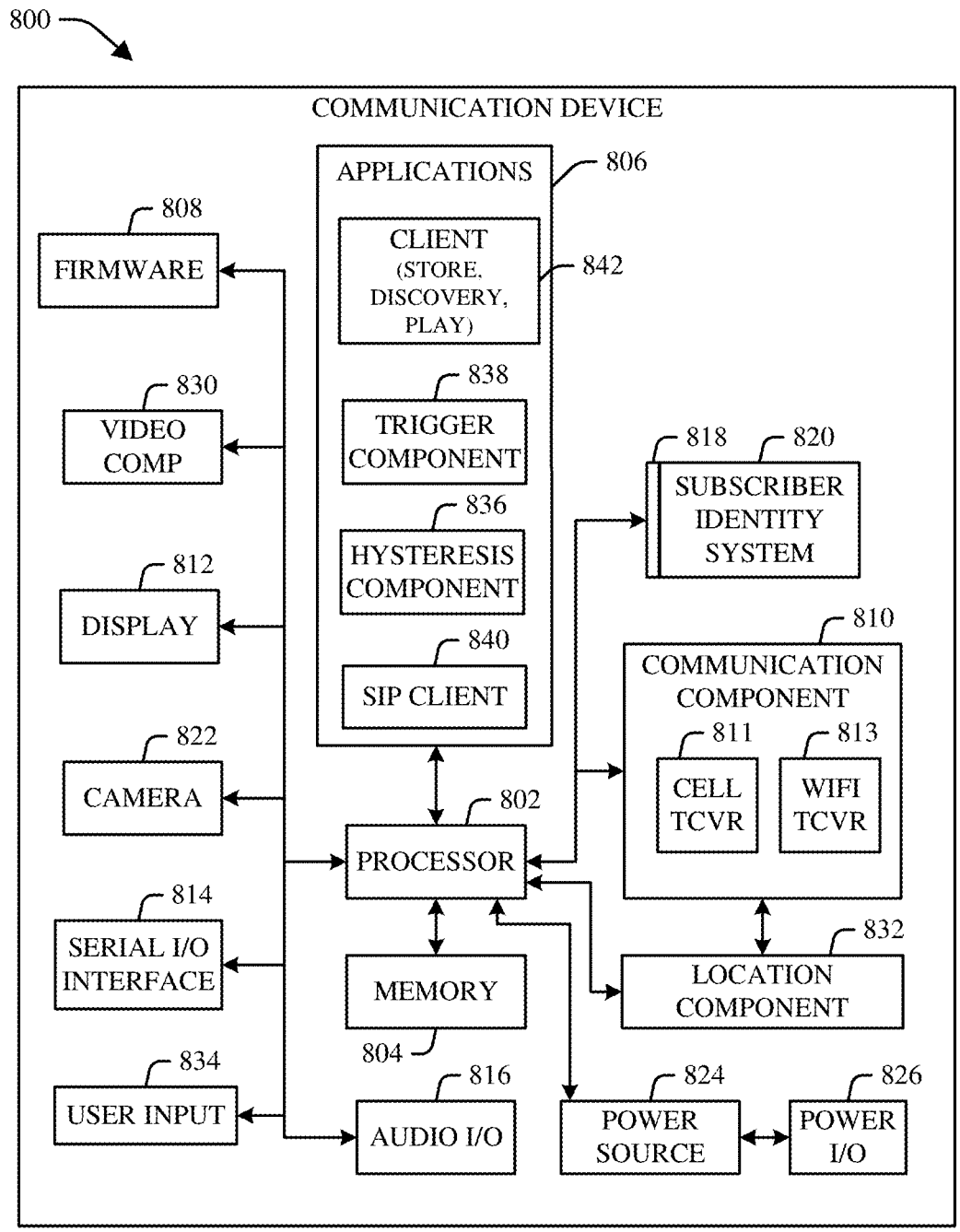
FIG. 8 depicts a block diagram of an example communication device operable to engage in a system architecture that facilitates wireless communications according to one or more embodiments described herein.

Referring now to FIG. 8, depicted is an example block diagram of an example communication device 800 (e.g., wireless or mobile phone, electronic pad or tablet, electronic eyewear, electronic watch, or other electronic bodywear, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 800 can include a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the communication device 800. A communication component 810 interfaces to the processor 802 to facilitate wired/wireless communication with external systems, e.g., cellular networks, VoIP networks, and so on. Here, the communication component 810 can also include a suitable cellular transceiver 811 (e.g., a GSM transceiver) and/or an unlicensed transceiver 813 (e.g., Wi-Fi, WiMax) for corresponding signal communications. The communication device 800 can be a device such as a cellular telephone, a PDA with mobile communications capabilities, and messaging-centric devices. The communication component 810 also facilitates communications reception from terrestrial radio networks (e.g., broadcast), digital satellite radio networks, and Internet-based radio services networks.

The communication device 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The communication device 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the communication device 800, and updated by downloading data and software.

The communication device 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the communication device 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The communication device 800 also includes a power source 824 in the form of batteries and/or an AC power subsystem, which power source 824 can interface to an external power system or charging equipment (not shown) by a power I/O component 826.

The communication device 800 can also include a video component 830 for processing video content received and, for recording and transmitting video content. For example, the video component 830 can facilitate the generation, editing and sharing of video quotes. A location tracking component 832 facilitates geographically locating the communication device 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the communication device 800 to support SIP protocols and register the subscriber with the SIP registrar server. The applications 806 can also include a client 842 that provides at least the capability of discovery, play and store of multimedia content, for example, music.

The communication device 800, as indicated above related to the communication component 810, includes an indoor network radio transceiver 813 (e.g., Wi-Fi transceiver). This function supports the indoor radio link, such as IEEE 802.11, for the dual-mode GSM device (e.g., communication device 800). The communication device 800 can accommodate at least satellite radio services through a device (e.g., handset device) that can combine wireless voice and digital radio chipsets into a single device (e.g., single handheld device).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 9-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 9:
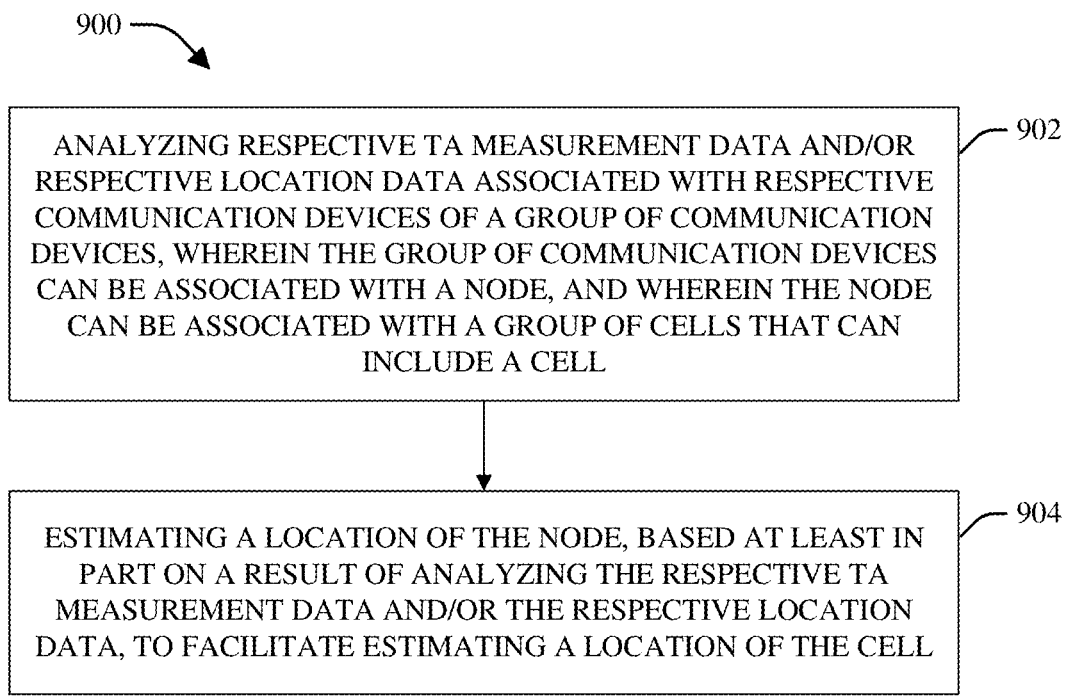
FIG. 9 illustrates a flow chart of an example method that can estimate a location of a node to facilitate estimating a location of a cell associated with the node, in accordance with various aspects and embodiments of the disclosed subject matter.

FIG. 9 illustrates a flow chart of an example method 900 that can estimate a location of a node (e.g., base station) to facilitate estimating a location of a cell associated with the node, in accordance with various aspects and embodiments of the disclosed subject matter. The method 900 can be employed by, for example, a system that can include the CLC, a processor component (e.g., of or associated with the CLC), and/or a data store (e.g., of or associated with the CLC).

At 902, respective TA measurement data and/or respective location data associated with respective communication devices of a group of communication devices can be analyzed, wherein the group of communication devices can be associated with a node, and wherein the node can be associated with a group of cells that can include a cell. The group of communication devices can be associated with (e.g., connected to, served by, reporting information to, detected by, or otherwise associated with) a node (e.g., base station) that can comprise or be associated with a group of cells, which can include one or more cells (e.g., co-located cells), such as the cell. The CLC can receive the respective TA measurement data and/or the respective location data associated with the respective communication devices from the respective communication devices or from a network device(s) (e.g., base station or other network device) of the communication network. The CLC can analyze the respective TA measurement data and/or the respective location data associated with the respective communication devices.

At 904, a location of the node can be estimated, based at least in part on a result of analyzing the respective TA measurement data and/or the respective location data, to facilitate estimating a location of the cell. Based at least in part on the result of analyzing the respective TA measurement data and/or the respective location data associated with the respective communication devices, the CLC can estimate the location of the node to facilitate estimating the location of the cell, as more fully described herein. Using the estimated location of the cell, the CLC also can validate, or at least attempt to validate, the estimated location of the cell or a recorded cell location of the cell, which can be obtained from a cell location pool or other data source by the CLC, as more fully described herein.

Figure 10:
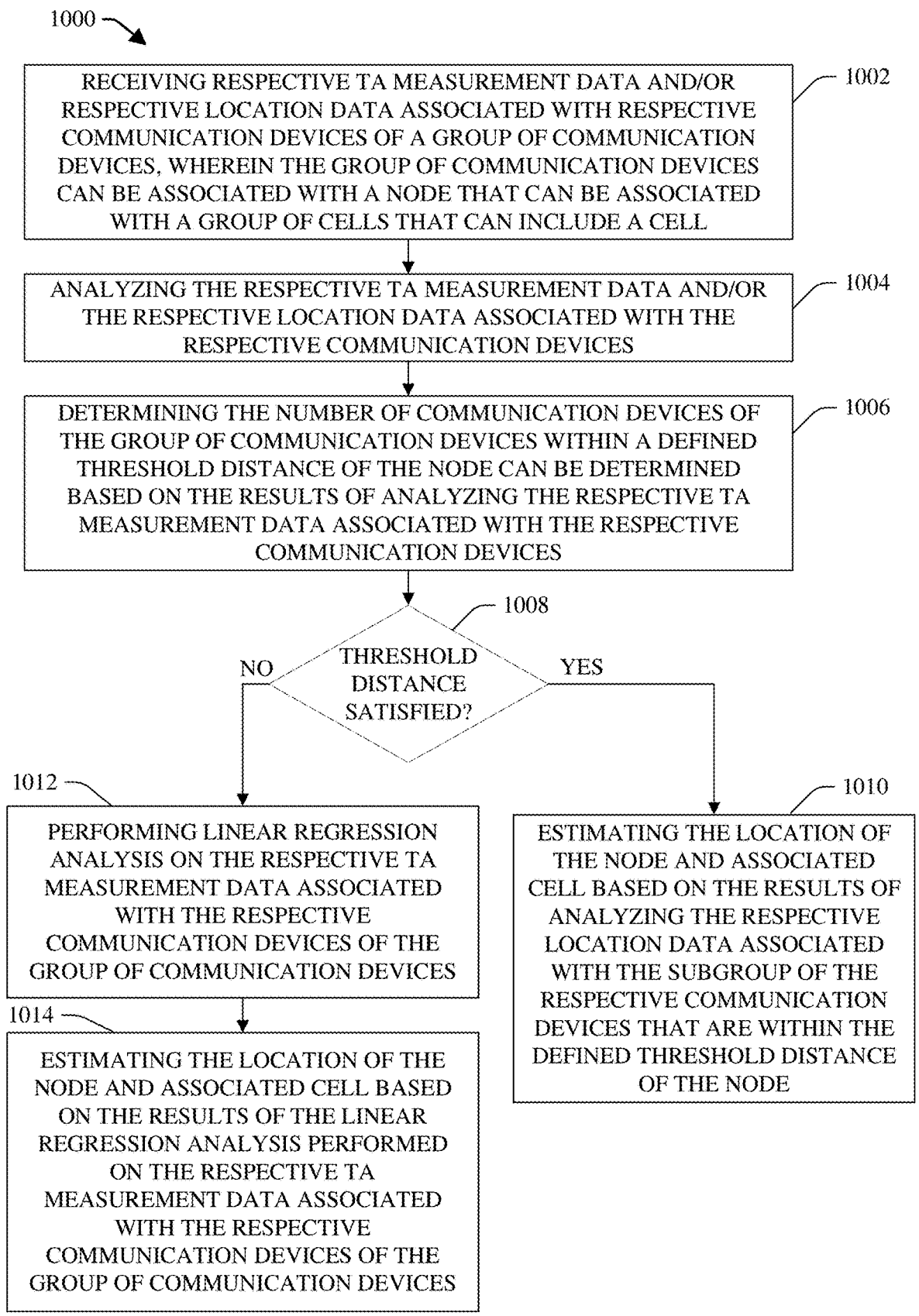
FIG. 10 depicts a flow chart of another example method that can estimate a location of a node to facilitate estimating a location of a cell associated with the node, in accordance with various aspects and embodiments of the disclosed subject matter.

FIG. 10 depicts a flow chart of another example method 1000 that can estimate a location of a node (e.g., base station) to facilitate estimating a location of a cell associated with the node, in accordance with various aspects and embodiments of the disclosed subject matter. The method 1000 can be employed by, for example, a system that can include the CLC, a processor component (e.g., of or associated with the CLC), and/or a data store (e.g., of or associated with the CLC).

At 1002, respective TA measurement data and/or respective location data associated with respective communication devices of a group of communication devices can be received, wherein the group of communication devices can be associated with a node, and wherein the node can be associated with a group of cells that can include a cell. The group of communication devices can be associated with (e.g., connected to, served by, reporting information to, detected by, or otherwise associated with) a node (e.g., base station). The node can include or be associated with a group of cells, which can include one or more cells, such as the cell.

The CLC can receive (e.g., via and/or associated base stations) the respective TA measurement data and/or the respective location data associated with the respective communication devices from the respective communication devices or from a network device(s) of the communication network. For instance, the CLC can receive respective TA measurement data associated with some or all of the respective communication devices from a network device(s) of the communication network, wherein respective call trace records associated with the respective communication devices can include the respective TA measurement data. The CLC also can receive respective location data (e.g., GPS or AGPS location data, and/or IoT geolocation data) from some or all of the respective communication devices. The CLC can aggregate or combine the respective TA measurement data and/or the respective location data associated with the respective communication devices based at least in part on respective device identifiers and respective time data (e.g., timestamp data) associated with the respective communication devices.

At 1004, the respective TA measurement data and/or the respective location data associated with the respective communication devices can be analyzed. The CLC can analyze the respective TA measurement data and/or the respective location data associated with the respective communication devices.

At 1006, the number of communication devices of the group of communication devices within a defined threshold distance of the node can be determined based at least in part on the results of analyzing the respective TA measurement data associated with the respective communication devices.

At 1008, a determination can be made regarding whether the number of communication devices within the defined threshold distance of the node satisfies a defined threshold value (e.g., defined threshold number of communication devices, or defined threshold percentage of communication devices of the group of communication devices). The CLC can determine whether the number of communication devices within the defined threshold distance of the node (e.g., base station) satisfies (e.g., meets or exceeds) the defined threshold value (e.g., number or percentage), wherein the defined threshold value can be determined and/or set (e.g., by the CLC) in accordance with the defined cell location management criteria.

In response to determining that the number of communication devices within the defined threshold distance of the node satisfies the defined threshold value, at 1010, the location of the node, and the associated cell, can be estimated based at least in part on the results of analyzing the respective location data associated with the subgroup of the respective communication devices that are within the defined threshold distance of the node. In response to determining that the number of communication devices within the defined threshold distance of the node satisfies the defined threshold value, the CLC can estimate the location of the node, and accordingly, the associated cell, based at least in part on the results of analyzing the respective location data (e.g., AGPS data, GPS data, or IoT geolocation data) associated with the subgroup of the respective communication devices that are determined to be within the defined threshold distance of the node. In some embodiments, based at least in part on the results of analyzing the respective location data of the respective communication devices of the subgroup of communication devices, the CLC can estimate the location of the node and associated cell as a function of the median (or average) of the respective locations (e.g., AGPS, GPS, or IoT locations) of the respective communication devices of the subgroup in relation to the node.

Referring again to reference numeral 1008, if, at 1008, it is determined that the number of communication devices within the defined threshold distance of the node does not satisfy the defined threshold value, at 1012, linear regression analysis can be performed on the respective TA measurement data associated with the respective communication devices of the group of communication devices to facilitate estimating the location of the node and associated cell. In response to determining that the number of communication devices within the defined threshold distance of the node does not satisfy the defined threshold value, the CLC can perform the linear regression analysis on the respective TA measurement data associated with the respective communication devices of the group of communication devices, in accordance with (e.g., using or applying) the defined linear regression analysis algorithm, to facilitate estimating the location of the node and associated cell, as more fully described herein. In some embodiments, the CLC can utilize machine learning techniques or algorithms in connection with performing the linear regression analysis.

At 1014, the location of the node and associated cell can be estimated based at least in part on the results of the linear regression analysis performed on the respective TA measurement data associated with the respective communication devices of the group of communication devices. The CLC can estimate the location of the node, and accordingly, the associated cell, based at least in part on the results of the linear regression analysis performed on the respective TA measurement data associated with the respective communication devices, as more fully described herein.

Figure 11:
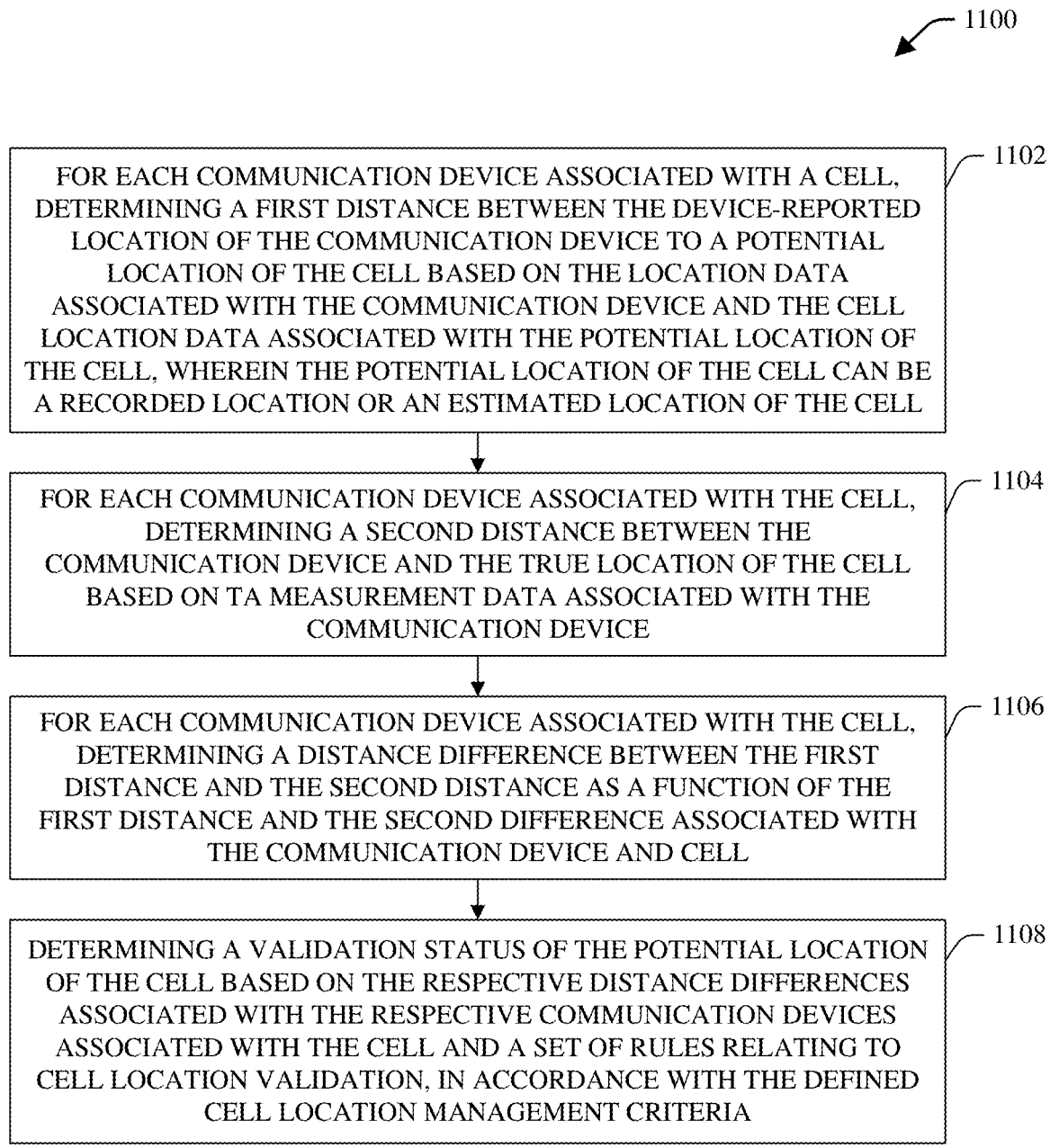
FIG. 11 presents a flow chart of an example method that can determine distance differences between a recorded or estimated location of a cell and respective locations of respective communication devices of a group of communication devices associated with the cell, to facilitate determining a validation status of the recorded location and/or estimated location of the cell, in accordance with various aspects and embodiments of the disclosed subject matter.

FIG. 11 presents a flow chart of an example method 1100 that can determine distance differences between a recorded or estimated location of a cell and respective locations of respective communication devices of a group of communication devices associated with the cell, to facilitate determining a validation status of the recorded location and/or estimated location of the cell, in accordance with various aspects and embodiments of the disclosed subject matter. The method 1100 can be employed by, for example, a system that can include the CLC, a processor component (e.g., of or associated with the CLC), and/or a data store (e.g., of or associated with the CLC).

At 1102, for each communication device associated with a cell, a first distance between the device-reported location of the communication device to a potential location of the cell can be determined based at least in part on the location data associated with the communication device and the cell location data associated with the potential location of the cell, wherein the potential location of the cell can be a recorded location of the cell or an estimated location of the cell. For each communication device associated with the cell, the CLC can determine (e.g., calculate) the first distance, D1, between the device-reported location of the communication device to the potential location of the cell based at least in part on the location data (e.g., AGPS or GPS location data) associated with the communication device and the cell location data associated with the potential location of the cell.

At 1104, for each communication device associated with the cell, a second distance between the communication device and the true location of the cell can be determined based at least in part on TA measurement data associated with the communication device. The TA measurement data associated with the communication device can be reported between the communication device and the cell at the true cell location. For each communication device associated with the cell, the CLC can determine the second distance, D2, between the communication device and the true location of the cell as a function of the TA measurement data associated with the communication device and a multipath effect value that can represent the multipath effect associated with the communication device.

At 1106, for each communication device associated with the cell, a distance difference between the first distance and the second distance can be determined as a function of the first distance and the second difference associated with the communication device and cell. For each communication device associated with the cell, the CLC can determine (e.g., calculate) the distance difference (DD) between the first distance and the second distance as a function of the first distance and the second difference associated with the communication device and cell. For example, the CLC can determine the distance difference as the absolute value of the difference between the first distance and the second distance associated with the communication device and cell. The absolute value of the distance difference between the first distance and the second difference can be less than or equal to the amount of error in distance between the potential location of the cell (e.g., recorded location of the cell or estimated location of the cell) and the true location of the cell, wherein such error in distance also can be referred to as ERR.

At 1108, a validation status of the potential location of the cell can be determined based at least in part on the respective distance differences associated with the respective communication devices associated with the cell and a set of rules relating to cell location validation, in accordance with the defined cell location management criteria. The CLC can determine the validation status of the potential location of the cell (e.g., recorded location of the cell or estimated location of the cell) based at least in part on the respective distance differences associated with the respective communication devices associated with the cell and the set of rules, as more fully described herein. The CLC can determine the validation status based at least in part on the result of determining which rule, if any, of the rule set is satisfied.

For instance, the CLC can determine (e.g., calculate) the respective upper bounds (UBs) of ERR associated with the respective communication devices based at least in part on (e.g., as a function of) the respective first distances and the respective TA measurement data (and a defined distance factor) associated with the respective communication devices, as more fully described herein. If the CLC determines that the respective UBs of ERR associated with a portion of the respective communication devices in a defined percentile (e.g., a bottom or lower end percentile, such as 1 percentile, which can be the bottom 1% of the UB values associated with the communication devices, or another desired percentile value) satisfy the defined threshold distance (e.g., 150 meters, or other desired distance greater than or less than 150 meters) associated with a first rule of the set of rules, the CLC can determine that the potential (e.g., recorded or estimated) location of the cell is good, can flag the potential location of the cell as being good, and can tag the potential location of the cell as accurate.

If the CLC determines that one or more of the respective UBs of ERR associated with the portion of the respective communication devices in the defined percentile do not satisfy the defined threshold distance associated with the first rule, the CLC can determine that further analysis is to be performed to facilitate determining whether the potential cell location is to be flagged as good and tagged as accurate, is to be flagged as fine and tagged as acceptable, is to be flagged as bad and tagged as unacceptable, or is to be flagged and tagged as uncertain, based at least in part on the set of rules, as more fully described herein.

Figure 12:
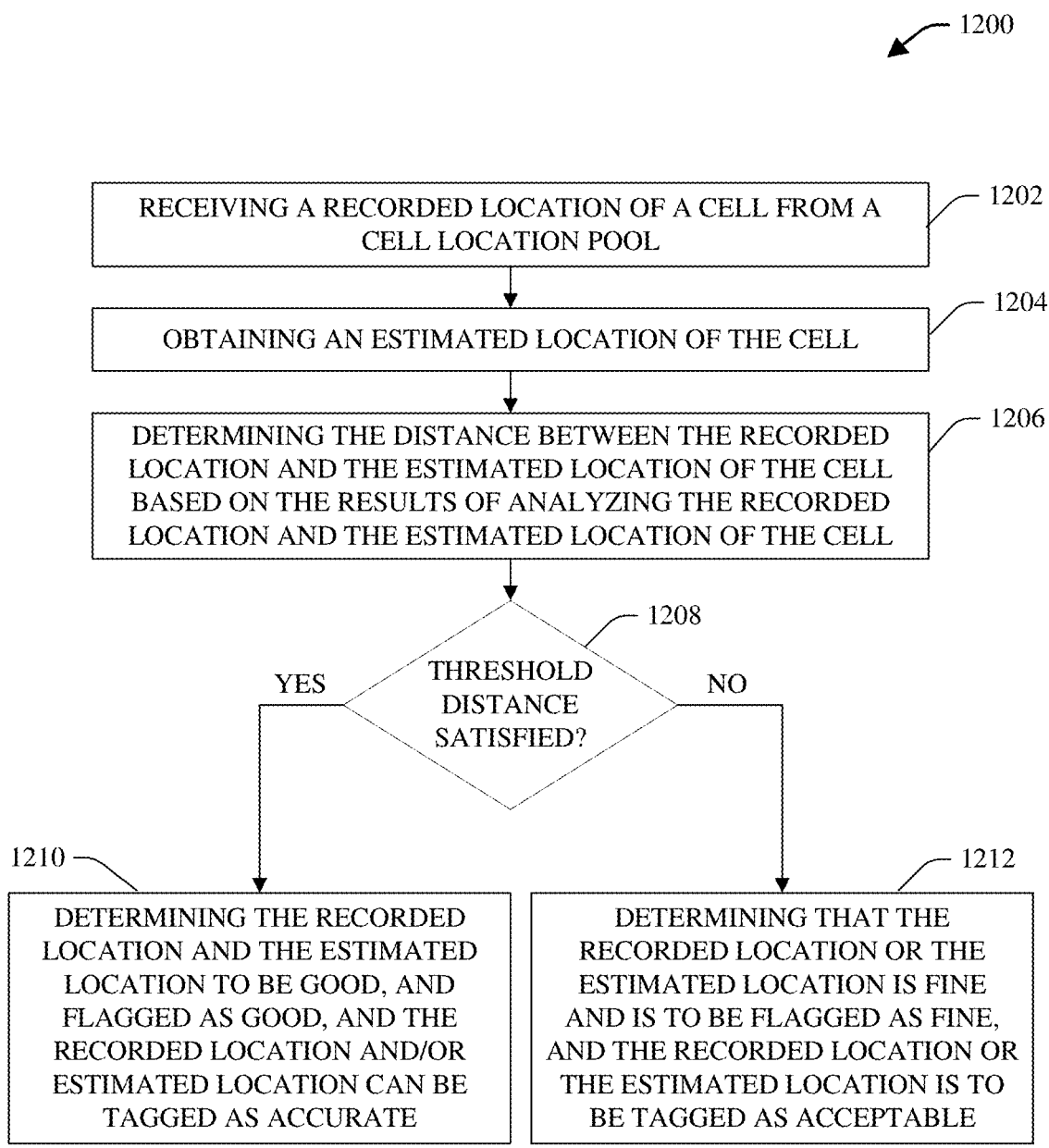
FIG. 12 illustrates a flow chart of an example method that can determine a distance between a recorded location of a cell and an estimated location of the cell to facilitate determining a validation status of the recorded location and/or estimated location of the cell, in accordance with various aspects and embodiments of the disclosed subject matter.

FIG. 12 illustrates a flow chart of an example method 1200 that can determine a distance between a recorded location of a cell and an estimated location of the cell to facilitate determining a validation status of the recorded location and/or estimated location of the cell, in accordance with various aspects and embodiments of the disclosed subject matter. The method 1200 can be employed by, for example, a system that can include the CLC, a processor component (e.g., of or associated with the CLC), and/or a data store (e.g., of or associated with the CLC). The method 1200 can facilitate cross validation of the recorded location and the estimated location of the cell, as well as facilitate determining a validation status of the recorded location and/or estimated location of the cell.

The method 1200 can be utilized, for example, in instances where the CLC determines that one or more of the respective UBs of ERR associated with the portion of the respective communication devices in the defined percentile (e.g., a bottom or lower end percentile, such as 1 percentile) do not satisfy the defined threshold distance associated with the first rule, and the CLC determines that one or more of the respective distance differences (DDs) associated with a second portion of the respective communication devices in a second defined percentile (e.g., another lower end percentile, such as the $25^{th}$ percentile) do not satisfy a second defined threshold distance associated with a second rule of the set of rules, as more fully described herein.

At 1202, a recorded location of a cell can be received from a cell location pool. The CLC can receive the recorded location of the cell from the cell location pool.

At 1204, an estimated location of the cell can be obtained. The CLC can obtain (e.g., retrieve) the estimated location of the cell from a data store (e.g., when the estimated cell location already has been determined) of the CLC or can obtain the estimated location of the cell by determining the estimated location. For instance, the CLC can determine the estimated location of the cell, as more fully described herein, and can store the estimated location of the cell in the data store and/or can subsequently (e.g., immediately or substantially immediately) use the estimated location of the cell to facilitate determining a validation status of the recorded location and/or estimated location of the cell.

At 1206, the distance between the recorded location and the estimated location of the cell can be determined based at least in part on the results of analyzing the recorded location and the estimated location of the cell. The CLC can analyze the recorded location of the cell and the estimated location of the cell. Based at least in part on the results of the analysis, the CLC can determine (e.g., calculate) the distance between the recorded location of the cell and the estimated location of the cell (the D_RE).

At 1208, a determination can be made regarding whether the distance between the recorded location and the estimated location of the cell satisfies a defined threshold distance. The CLC can determine whether the distance between the recorded location and the estimated location of the cell satisfies (e.g., is equal to or less than) the defined threshold distance based at least in part on the result of comparing the distance to the defined threshold distance, wherein a defined rule (e.g., first rule of the set of rules) can specify the defined threshold distance to be applied. The CLC can determine or set the defined threshold distance (e.g., defined threshold D_RE) based at least in part on the defined cell location management criteria (e.g., the defined rule specified by the defined cell location management criteria). In some embodiments, the defined threshold distance can be 150 meters, and, in other embodiments, the defined threshold distance can be less than or more than 150 meters, as indicated or specified by the defined cell location management criteria.

In response to determining that the distance between the recorded location and the estimated location of the cell satisfies the defined threshold distance, at 1210, the recorded location and the estimated location can be determined to be, and flagged as, good, and the recorded location and/or estimated location can be tagged as accurate. In response to determining that the distance between the recorded location and the estimated location of the cell satisfies the defined threshold distance, the CLC can determine that the recorded location and the estimated location are good, can flag the recorded location and/or estimated location as being good, and can tag the recorded location and/or estimated location as accurate.

Referring again to reference numeral 1208, if, at 1208, it is determined that the distance between the recorded location and the estimated location of the cell does not satisfy (e.g., exceeds) the defined threshold distance, at 1212, the recorded location or the estimated location can be determined to be, and flagged as, fine, and the recorded location or estimated location can be tagged as acceptable. In response to determining that the distance between the recorded location and the estimated location of the cell does not satisfy the defined threshold distance, the CLC can determine that the recorded location or the estimated location is fine, and is to be flagged as fine, and the recorded location or estimated location can be tagged as acceptable, as more fully described herein. With regard to multiple potential cell locations being evaluated, if more than one potential cell location is able to be flagged as fine, the CLC can determine the best (e.g., more accurate) cell location of those potential cell locations, and can flag the best cell location as fine and tag that best cell location as acceptable, wherein the best cell location can be associated with the best data source, which can be the estimator component and its estimated cell location or a data source associated with a recorded data source.

Figure 13:
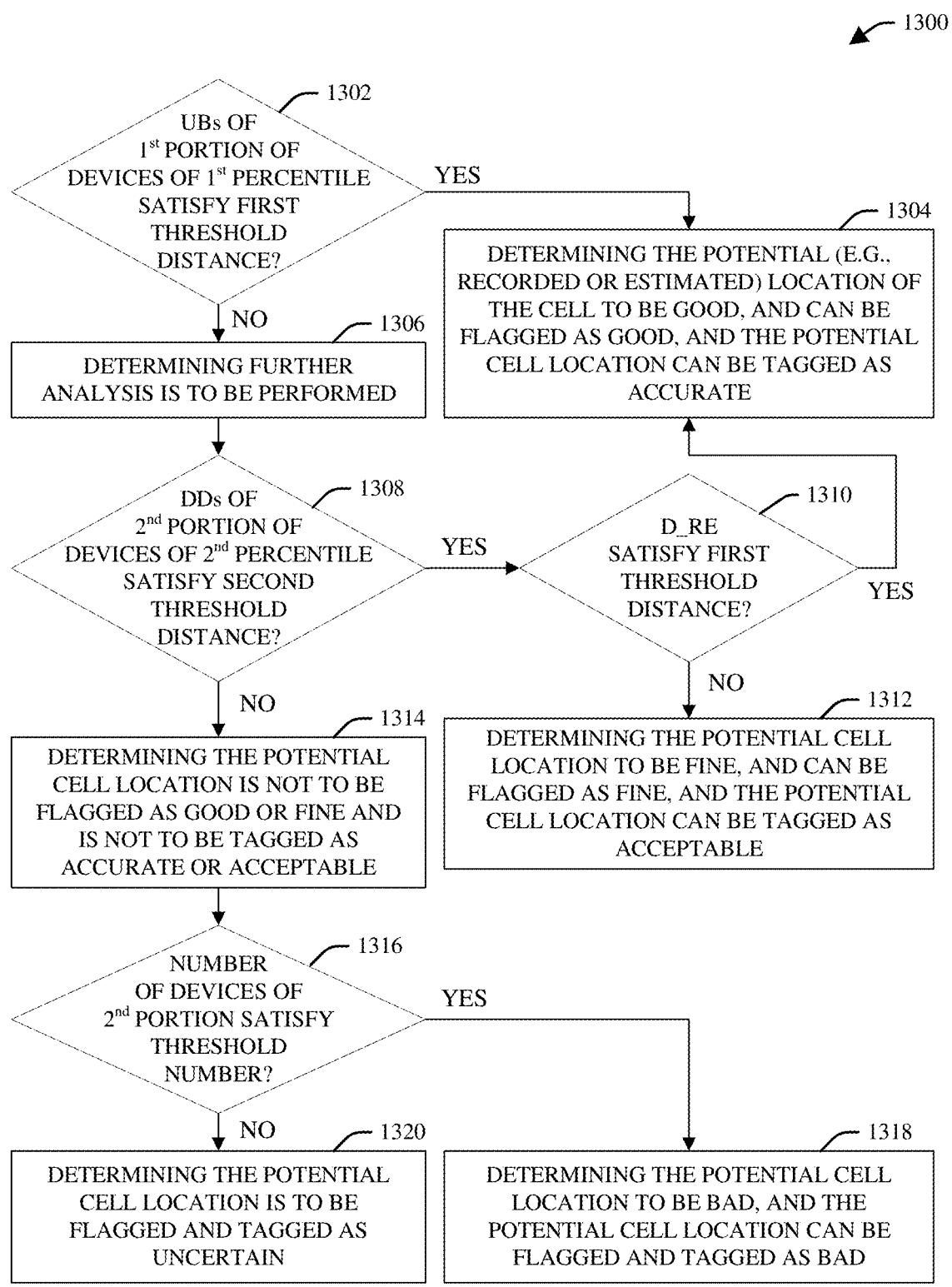
FIG. 13 illustrates a flow chart of an example method that can determine a validation status of a recorded location and/or an estimated location of a cell based at least in part on the distance between the recorded location and the estimated location, and/or distance differences between the recorded and/or estimated location of the cell and respective locations of respective communication devices of a group of communication devices associated with the cell, to facilitate determining a validation status of the recorded location and/or estimated location of the cell, in accordance with various aspects and embodiments of the disclosed subject matter.

FIG. 13 illustrates a flow chart of an example method 1300 that can determine a validation status of a recorded location and/or an estimated location of a cell based at least in part on the distance between the recorded location and the estimated location, and/or distance differences between the recorded and/or estimated location of the cell and respective locations of respective communication devices of a group of communication devices associated with the cell, to facilitate determining a validation status of the recorded location and/or estimated location of the cell, in accordance with various aspects and embodiments of the disclosed subject matter. The method 1300 can be employed by, for example, a system that can include the CLC, a processor component (e.g., of or associated with the CLC), and/or a data store (e.g., of or associated with the CLC).

At 1302, a determination can be made regarding whether respective UBs of ERR associated with a first portion of the respective communication devices in a first defined percentile satisfy the first defined threshold distance associated with a first rule of a set of rules. The CLC can determine (e.g., calculate) the respective UBs of ERR associated with the respective communication devices based at least in part on (e.g., as a function of) respective first distances and respective TA measurement data (and a defined distance factor, such as, e.g., 78 m) associated with the respective communication devices, as more fully described herein. The CLC can determine whether the respective UBs of ERR associated with the first portion of the respective communication devices in the first defined percentile (e.g., a bottom or lower end percentile, such as 1 percentile, or another desired percentile value) satisfy the first defined threshold distance associated with the first rule.

In response to determining that the respective UBs of ERR associated with the first portion of the respective communication devices in the first defined percentile satisfy the first defined threshold distance associated with the first rule, at 1304, the potential (e.g., recorded or estimated) location of the cell can be determined to be, and can be flagged as, good, and the potential location can be tagged as accurate. If the CLC determines that the respective UBs of ERR associated with the first portion of the respective communication devices in the first defined percentile satisfy the defined threshold distance associated with the first rule, the CLC can determine that the potential (e.g., recorded or estimated) location of the cell is good, can flag the potential location of the cell as being good, and can tag the potential location of the cell as accurate. Accordingly, the potential location of the cell can have a validation status of accurate.

Referring again to reference numeral 1302, if, at 1302, it is determined that one or more of the respective UBs of ERR associated with the first portion of the respective communication devices in the first defined percentile do not satisfy the first defined threshold distance associated with the first rule, at 1306, a determination can be made that further analysis is to be performed to facilitate determining a validation status of the recorded location and/or estimated location of the cell. If the CLC determines that one or more of the respective UBs of ERR associated with the first portion of the respective communication devices in the first defined percentile do not satisfy the first defined threshold distance associated with the first rule, the CLC can determine that further analysis is to be performed to facilitate determining a validation status of the recorded location and/or estimated location of the cell based at least in part on the set of rules.

At 1308, a determination can be made regarding whether respective distance differences (DDs) associated with a second portion of the respective communication devices in a second defined percentile satisfy a second defined threshold distance associated with a second rule of the set of rules. The CLC can analyze (e.g., compare) the respective distance differences associated with the second portion of the respective communication devices in a second defined percentile (e.g., another lower end percentile, such as the $25^{th}$ percentile, which can be the bottom 25% of the respective distance differences associated with the respective communication devices, or other desired percentile value) satisfy the second defined threshold distance associated with the second rule. Based at least in part on the analysis results, the CLC can determine whether the respective distance differences associated with the second portion of the respective communication devices in the second defined percentile satisfy (e.g., are less than or equal to) the second defined threshold distance associated with the second rule. In accordance with various embodiments, the second defined threshold distance can be the same as the first defined threshold distance (e.g., 150 meters (or other desired distance)) or different from the first defined threshold distance, as indicated or specified by the defined cell location management criteria.

In response to determining that the respective distance differences associated with the second portion of the respective communication devices in the second defined percentile satisfy the second defined threshold distance associated with the second rule, at 1310, a determination can be made regarding whether the distance between the recorded location of a cell and the estimated location of the cell (D_RE) satisfies a first defined threshold distance associated with the first rule. To facilitate determining the validation status of the potential cell location, if the CLC determines that the respective distance differences associated with the second portion of the respective communication devices in the second defined percentile satisfy the second defined threshold distance associated with the second rule, the CLC can determine whether the distance between the recorded location of the cell and the estimated location of the cell (D_RE)

satisfies the first defined threshold distance associated with the first rule. For example, the CLC can compare the distance between the recorded location and the estimated location of the cell to the first defined threshold distance (e.g., 150 meters, or other desired distance greater than or less than 150 meters), which can be indicated or specified by the first rule, in accordance with the defined cell location management criteria. Based at least in part on the results of the comparison, the CLC can determine whether the distance between the recorded location and the estimated location of the cell satisfies the first defined threshold distance associated with the first rule.

If it is determined that the distance between the recorded location of the cell and the estimated location of the cell (D_RE) satisfies the first defined threshold distance associated with the first rule, the method 1300 can proceed from reference numeral 1310 to reference numeral 1304, wherein the potential (e.g., recorded or estimated) location of the cell can be determined to be, and can be flagged as, good, and the potential location can be tagged as accurate. For instance, if the CLC determines that the distance between the recorded location of the cell and the estimated location of the cell (D_RE) satisfies the first defined threshold distance associated with the first rule, the CLC can determine that the potential (e.g., recorded or estimated) location of the cell is good, can flag the potential location of the cell as being good, and can tag the potential location of the cell as accurate. Accordingly, the potential location of the cell can have a validation status of accurate.

Referring again to reference numeral 1310, if, at 1310, it is determined that the distance between the recorded location and the estimated location of the cell (DRE) does not satisfy (e.g., exceeds) the first defined threshold distance associated with the first rule, at 1312, the potential (e.g., recorded or estimated) location of the cell can be determined to be, and can be flagged as, fine, and the potential location can be tagged as acceptable. If the CLC determines that the distance between the recorded location and the estimated location of the cell does not satisfy the first defined threshold distance, the CLC can determine that the potential (e.g., recorded or estimated) location of the cell is fine, can flag the potential location of the cell as being fine, and can tag the potential location of the cell as acceptable. With regard to multiple potential cell locations being evaluated, if more than one potential cell location is able to be flagged as fine, the CLC can determine the best (e.g., more accurate) cell location of those potential cell locations, and can flag the best cell location as fine and tag that best cell location as acceptable, wherein the best cell location can be associated with the best data source, which can be the estimator component and its estimated cell location or a data source associated with a recorded data source. Accordingly, the potential location of the cell can have a validation status of acceptable.

Referring again to reference numeral 1308, if, at 1308, it is determined that one or more of the respective distance differences associated with the second portion of the respective communication devices in the second defined percentile do not satisfy the second defined threshold distance associated with the second rule, at 1314, it can be determined that the potential location of the cell is not to be flagged as good or fine and is not to be tagged as accurate or acceptable. If the CLC determines that one or more of the respective distance differences associated with the second portion of the respective communication devices in the second defined percentile do not satisfy the second defined threshold distance associated with the second rule, the CLC can determine that the potential location of the cell is not to be labeled or flagged as good or fine and is not to be tagged as accurate or acceptable. When determining whether to flag a potential cell location associated with the cell as fine (after determining that no potential cell location associated with the cell is to be flagged as good), the CLC can perform such cell location validation with regard to each of the potential cell locations of a cell to determine whether any of the potential cell locations can be flagged as fine. The CLC also can determine that further analysis is to be performed to facilitate determining whether the potential cell location is to be flagged as bad and tagged as unacceptable, or is to be flagged and tagged as uncertain, based at least in part on another rule (e.g., third rule) of the set of rules.

At 1316, a determination can be made regarding whether the number of communication devices in the second portion of communication devices in the second defined percentile satisfies a defined threshold number of communication devices associated with a third rule of the set of rules. The CLC can determine the number of communication devices in the second portion of communication devices in the second defined percentile, based at least in part on the analysis results. Further, based at least in part on the analysis results, the CLC can determine whether the number of communication devices in the second portion of communication devices in the second defined percentile satisfies (e.g., meets or exceeds) the defined threshold number (e.g., 30 or other desired number less than or greater than 30) of communication devices associated with the third rule. The defined threshold number can be indicated or specified by the defined cell location management criteria.

In response to determining that the number of communication devices in the second portion of communication devices in the second defined percentile satisfies the defined threshold number associated with the third rule, at 1318, the potential (e.g., recorded or estimated) location of the cell can be determined to be bad, and the potential location can be flagged and tagged as bad. If the CLC determines that the respective distance differences associated with the second portion of the respective communication devices in the second defined percentile satisfy the second defined threshold distance associated with the second rule, the CLC can determine that the potential (e.g., recorded or estimated) location of the cell is bad or unacceptable, can flag and tag the potential location of the cell as being bad or unacceptable. Accordingly, the potential location of the cell can have a validation status of bad or unacceptable.

Referring again to reference numeral 1316, if, at 1316, it is determined that the number of communication devices in the second portion of communication devices in the second defined percentile does not satisfy the defined threshold number associated with the third rule, at 1320, it can be determined that the potential location of the cell is to be flagged and tagged as uncertain. If the CLC determines that the number of communication devices in the second portion of communication devices in the second defined percentile does not satisfy (e.g., is not greater than or equal to) the defined threshold number associated with the third rule, the CLC can determine that the potential location of the cell is to be flagged and tagged as uncertain. Accordingly, the potential location of the cell can have a validation status of uncertain.

Figure 14:
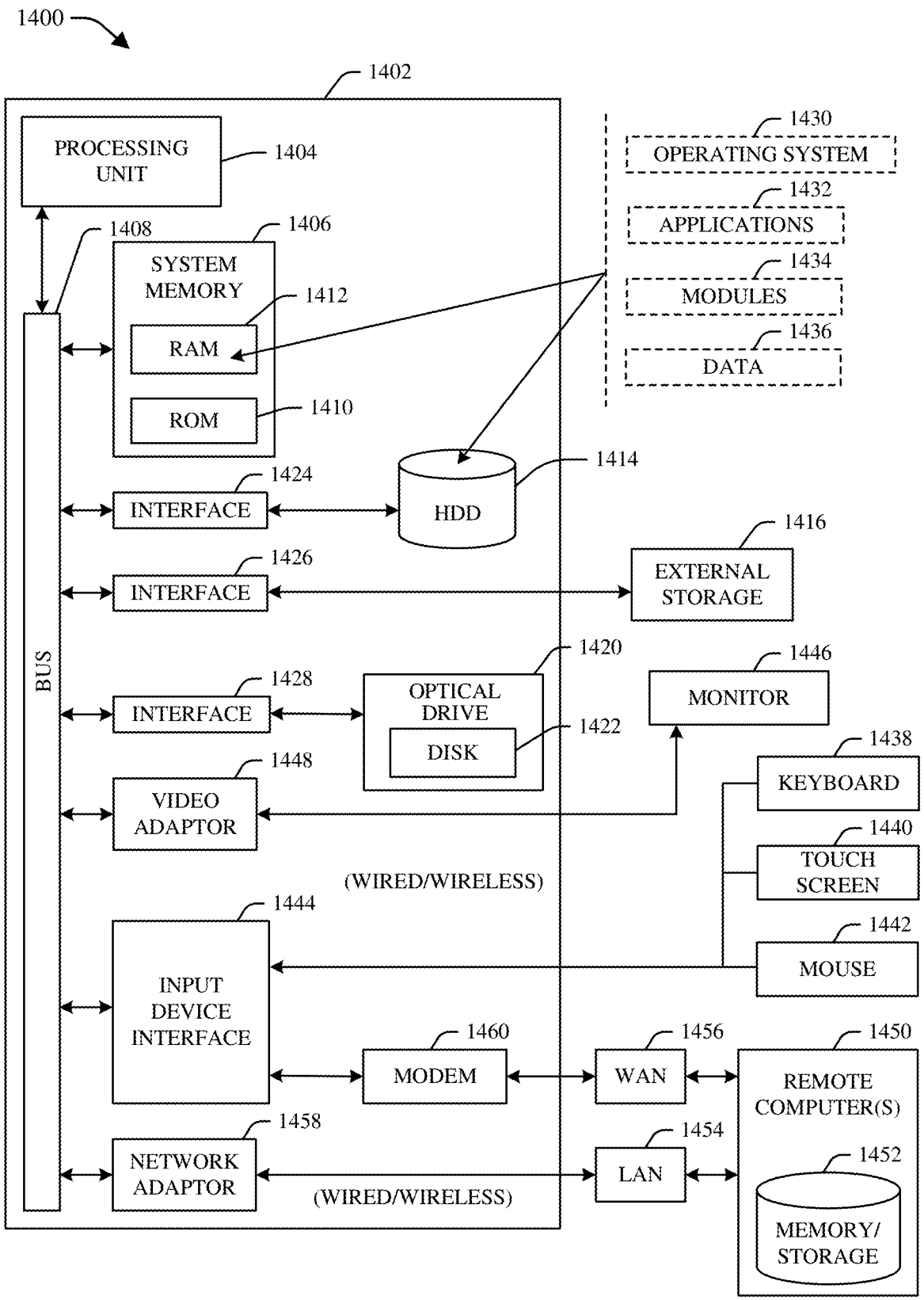
FIG. 14 is a schematic block diagram illustrating a suitable computing environment in which the various embodiments of the embodiments described herein can be implemented.

In order to provide additional context for various embodiments described herein, FIG. 14 and the following discussion are intended to provide a brief, general description of a suitable computing environment 1400 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH™ interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456, e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, base station, cell, RAN, communication network, cell location component, estimator component, validator component, machine learning component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
analyzing, by a system comprising a processor, respective timing advance measurement data associated with respective devices of a first group of devices and respective location data associated with the respective devices, wherein the first group of devices is associated with a base station, and wherein the base station is associated with a second group of cells comprising a cell;
estimating, by the system, a first location of the base station device, based on a first result of analyzing the respective timing advance measurement data and the respective location data, to facilitate estimating a second location of the cell; and
in connection with the estimating, determining, by the system, an estimation process of a group of estimation processes to utilize to facilitate the estimating of the first location of the base station, wherein the group of estimation processes comprises a linear regression analysis process and a different estimation process, wherein the determining of the estimation process comprises determining whether to utilize the linear regression analysis process to facilitate the estimating of the first location of the base station based on a second result of determining whether respective distances between the respective devices and the base station satisfy a defined threshold distance value.

2. The method of claim 1, wherein the different estimation process is a timing advance measurement process, and wherein the method further comprises:
based on a third result of analyzing the respective timing advance measurement data associated with the respective devices, determining, by the system, whether the respective distances between the respective devices and the base station satisfy the defined threshold distance value, wherein the respective timing advance measurement data indicates the respective distances between the respective devices and the base station; and
based on the second result of determining whether the respective distances between the respective devices and the base station satisfy the defined threshold distance value, determining, by the system, whether to utilize the timing advance measurement process or the linear regression analysis process to facilitate the estimating of the first location of the base station.

3. The method of claim 2, further comprising:
based on the second result indicating that an insufficient number of the respective distances between the respective devices and the base station satisfy the defined threshold distance value, determining, by the system, that the linear regression analysis process is to be utilized to facilitate the estimating of the first location of the base station; and
performing, by the system, a linear regression analysis on the respective timing advance measurement data associated with the respective devices, in accordance with the linear regression analysis process, wherein the estimating of the first location of the base station comprises estimating the first location of the base station based on a fourth result of the linear regression analysis.

4. The method of claim 2, further comprising:
based on the second result indicating that a sufficient number of the respective distances between the respective devices and the base station satisfy the defined threshold distance value, determining, by the system, that the timing advance measurement process is to be utilized to facilitate the estimating of the first location of the base station; and
determining, by the system, a median distance between the base station and the respective devices based on the respective location data, in accordance with the timing advance measurement process, wherein the estimating of the first location of the base station comprises estimating the first location of the base station based on the median distance between the base station and the respective devices.

5. The method of claim 1, wherein a potential cell location of the cell is the second location of the cell or a recorded location of the cell, wherein the recorded location of the cell is received from a data source device, and wherein the method further comprises:
determining, by the system, whether the potential cell location of the cell is a valid cell location of the cell based on the second location of the cell, the recorded location of the cell, or the respective timing advance measurement data associated with the respective devices, and based on a third group of threshold accuracy values.

6. The method of claim 5, further comprising:
tagging, by the system, the potential cell location of the cell as one of an accurate status, an acceptably accurate status, an inaccurate status, or an uncertain status, based on a determination result of determining whether the potential cell location of the cell is the valid location of the cell, wherein the third group of threshold accuracy values comprises a first threshold accuracy value associated with the accurate status, a second threshold accuracy value associated with the acceptably accurate status, and a third threshold accuracy value associated with the inaccurate status and the uncertain status.

7. The method of claim 1, wherein a potential cell location of the cell is the second location of the cell or a recorded location of the cell, wherein the recorded location of the cell is received from a data source device, wherein the respective distances are respective first distances, and wherein the method further comprises:
determining, by the system, respective second distances between the potential cell location and the respective devices based on the respective location data;
determining, by the system, respective upper bound values of error as a function of the respective second distances and the respective timing advance measurement data; and
determining, by the system, whether the respective upper bound values of error satisfy a defined threshold upper bound value of error relating to a reliability of the recorded location of the cell or the second location of the cell.

8. The method of claim 7, further comprising:
in response to determining that the respective upper bound values of error satisfy the defined threshold upper bound value of error, determining, by the system, that the recorded location of the cell or the second location of the cell is to be flagged as good and tagged with an accurate status.

9. The method of claim 7, further comprising:
in response to determining that one or more of the respective upper bound values of error do not satisfy the defined threshold upper bound value of error, determining, by the system, respective third distances between the potential cell location and the respective devices based on the respective timing advance measurement data;
determining, by the system, respective distance differences between the respective second distances and the respective third distances; and
determining, by the system, whether the respective distance differences between the respective second distances and the respective third distances satisfy a defined threshold distance difference value.

10. The method of claim 9, wherein the defined threshold distance value is a first defined threshold distance value, and wherein the method further comprises:
in response to determining that the respective distance differences satisfy the defined threshold distance difference value, determining, by the system, a distance between the recorded location of the cell and the second location of the cell; and
determining, by the system, whether the distance satisfies a second defined threshold distance value relating to the reliability of the recorded location of the cell or the second location of the cell.

11. The method of claim 10, further comprising:
one of:
in response to determining that the distance satisfies the second defined threshold distance value, determining, by the system, that the recorded location of the cell or the second location of the cell is to be flagged as good and tagged with an accurate status, or in response to determining that the distance does not satisfy the second defined threshold distance value, determining, by the system, that the recorded location of the cell or the second location of the cell is to be flagged as fine and tagged with an acceptably accurate status.

12. The method of claim 9, further comprising:
in response to determining that the respective distance differences do not satisfy the defined threshold distance difference value, determining, by the system, that the recorded location of the cell or the second location of the cell is to be flagged as bad or uncertain.

13. The method of claim 12, further comprising:
in response to determining that the respective distance differences do not satisfy the defined threshold distance difference value, determining, by the system, whether a number of devices of the respective devices satisfies a defined threshold number relating to sufficiency of cell location-related data; and one of:
in response to determining that the number of devices satisfies the defined threshold number, determining, by the system, that the recorded location of the cell or the second location of the cell is to be flagged as bad and tagged with an inaccurate status, or in response to determining that the number of devices does not satisfy the defined threshold number, determining, by the system, that the recorded location of the cell or the second location of the cell is to be flagged as uncertain and tagged with an uncertain status.

14. A system, comprising:
a processor; and
a memory that stores executable instructions that, when executed by the processor, facilitate performance of operations, comprising:
analyzing respective timing advance measurement information and respective location information associated with respective devices of a first group of devices, wherein the first group of devices is associated with network equipment, and wherein the network equipment is associated with a second group of cells comprising a cell;
estimating a first location of the network equipment, based on a first result of analyzing the respective timing advance measurement information and the respective location information, to facilitate estimating a second location of the cell; and
determining an estimation procedure of a group of estimation procedures to utilize to facilitate the estimating of the first location of the network equipment, wherein the group of estimation processes comprises a linear regression analysis procedure and a disparate estimation procedure, wherein the determining of the estimation procedure comprises determining whether to apply the linear regression analysis procedure to facilitate the estimating of the first location of the network equipment based on a second result of determining whether respective distances between the respective devices and the network equipment satisfy a defined threshold distance value.

15. The system of claim 14, wherein the different estimation process is a timing advance measurement procedure, and wherein the operations further comprise:

based on a third result of analyzing the respective timing advance measurement information associated with the respective devices, determining whether the respective distances between the respective devices and the network equipment satisfy the defined threshold distance value, wherein the respective timing advance measurement information indicates the respective distances between the respective devices and the network equipment; and based on second result of determining whether the respective distances between the respective devices and the network equipment satisfy the defined threshold distance value, determining whether to utilize the linear regression analysis procedure or the timing advance measurement procedure to facilitate the estimating of the first location of the network equipment.

16. The system of claim 15, wherein the operations further comprise:
based on the second result indicating that an insufficient number of the respective distances between the respective devices and the network equipment satisfy the defined threshold distance value, determining that the linear regression analysis procedure is to be utilized to facilitate the estimating of the first location of the network equipment; and performing the linear regression analysis procedure on the respective timing advance measurement information associated with the respective devices, wherein the estimating of the first location of the network equipment comprises estimating the first location of the network equipment based on a fourth result of the linear regression analysis procedure.

17. The system of claim 15, wherein the operations further comprise:
based on the second result indicating that a sufficient number of the respective distances between the respective devices and the network equipment satisfy the defined threshold distance value, determining that the timing advance measurement procedure is to be utilized to facilitate the estimating of the first location of the network equipment; and determining a median distance between the network equipment and the respective devices based on the respective location information, in accordance with the timing advance measurement procedure, wherein the estimating of the first location of the network equipment comprises estimating the first location of the network equipment based on the median distance between the network equipment and the respective devices.

18. The system of claim 14, wherein a potential cell location of the cell is the second location of the cell or a recorded location of the cell, wherein the recorded location of the cell is received from a data source device, and wherein the operations further comprise:
determining whether the potential cell location of the cell is a valid cell location of the cell based on the second location of the cell, the recorded location of the cell, or the respective timing advance measurement information associated with the respective devices, and based on a third group of threshold accuracy values; and based on a determination result of determining whether the potential cell location of the cell is the valid location of the cell, tagging the potential cell location of the cell as one of an accurate status, an acceptably accurate status, an inaccurate status, or an uncertain status, wherein the third group of threshold accuracy values comprises a first threshold accuracy value associated with the accurate status, a second threshold accuracy value associated with the acceptably accurate status, and a third threshold accuracy value associated with the inaccurate status and the uncertain status.

19. A non-transitory machine-readable medium, comprising executable instructions that, when executed by a processor, facilitate performance of operations, comprising:
   evaluating respective trace record data and respective location data associated with respective devices that are associated with a base station, wherein the base station is associated with a group of cells comprising a cell;
   estimating a first location of the base station, based on a result of evaluating the respective trace record data and the respective location data, to facilitate estimating a second location of the cell; and
   determining an estimation process of a group of estimation processes to utilize to facilitate the estimating of the first location of the base station, wherein the group of estimation processes comprises a linear regression analysis process and a timing advance measurement process, wherein the determining of the estimation process comprises determining whether to employ the linear regression analysis process to facilitate the estimating of the first location of the base station based on a second result of determining whether respective distances between the respective devices and the base station satisfy a defined threshold distance value.

20. The non-transitory machine-readable medium of claim 19, wherein a potential cell location of the cell is the second location of the cell or a recorded location of the cell, wherein the recorded location of the cell is received from a recorded cell location device, and wherein the operations further comprise:
   determining whether the potential cell location of the cell is a valid cell location of the cell based on the second location of the cell, the recorded location of the cell, or the respective timing advance measurement data associated with the respective devices, and based on a third group of threshold accuracy values; and
   based on a determination result of determining whether the potential cell location of the cell is the valid location of the cell, tagging the potential cell location of the cell as one of an accurate status, an acceptably accurate status, an inaccurate status, or an uncertain status, wherein the third group of threshold accuracy values comprises a first threshold accuracy value associated with the accurate status, a second threshold accuracy value associated with the acceptably accurate status, and a third threshold accuracy value associated with the inaccurate status and the uncertain status.

\* \* \* \* \*